US012388210B2

(12) United States Patent
Tanaka et al.

(10) Patent No.: US 12,388,210 B2
(45) Date of Patent: Aug. 12, 2025

(54) CONNECTOR

(71) Applicant: IRISO ELECTRONICS CO., LTD., Yokohama (JP)

(72) Inventors: Hitoshi Tanaka, Yokohama (JP); Tomomitsu Saito, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 486 days.

(21) Appl. No.: 17/893,347

(22) Filed: Aug. 23, 2022

(65) Prior Publication Data

US 2023/0063823 A1 Mar. 2, 2023

(30) Foreign Application Priority Data

Aug. 25, 2021 (JP) ................................. 2021-137632

(51) Int. Cl.

| | |
|---|---|
| ***H01R 13/415*** | (2006.01) |
| ***H01R 13/24*** | (2006.01) |
| ***H01R 13/502*** | (2006.01) |
| ***H01R 13/516*** | (2006.01) |
| ***H01R 13/533*** | (2006.01) |

(52) U.S. Cl.

CPC ....... *H01R 13/415* (2013.01); *H01R 13/2407* (2013.01); *H01R 13/502* (2013.01); *H01R 13/516* (2013.01); *H01R 13/533* (2013.01); *H01R 2201/26* (2013.01)

(58) Field of Classification Search

CPC .............. H01R 13/415; H01R 13/2407; H01R 13/502; H01R 13/516; H01R 13/533; H01R 2201/26; H01R 13/112; H01R 12/712; H01R 12/91

See application file for complete search history.

(56) References Cited

U.S. PATENT DOCUMENTS

| | | | | |
|---|---|---|---|---|
| 9,246,283 B2 * | 1/2016 | Sato | .................. | H01R 13/6315 |
| 9,997,854 B2 * | 6/2018 | Kobayashi | ........... | H01R 13/502 |

(Continued)

FOREIGN PATENT DOCUMENTS

| | | |
|---|---|---|
| EP | 3540864 A1 | 9/2019 |
| EP | 4027463 A1 | 7/2022 |

(Continued)

OTHER PUBLICATIONS

Partial European Search Report, for European Patent Application No. 22191903.8, dated Jan. 23, 2023, 16 pages.

(Continued)

*Primary Examiner* — Edwin A. Leon

(74) *Attorney, Agent, or Firm* — Westman, Champlin & Koehler, P.A.

(57) ABSTRACT

The connector 10 includes a movable housing 40 that is displaceable with respect to an attachment object 90 in an X direction, which is a direction perpendicular to a connection direction, and a terminal 20 configured to electrically connect the attachment object 90 and a connection object 80. The terminal 20 includes the displacement portion 24 that is displaceable in the X direction with respect to the attachment object 90. The contact portions **24*c*1 and 24*f*1 configured to contact the connection object 80 are formed in the displacement portion 24. Here, the displacement portion 24 is displaceable with respect to the movable housing 40**.

9 Claims, 13 Drawing Sheets

(56) References Cited

U.S. PATENT DOCUMENTS

| | | | | |
|---|---|---|---|---|
| 10,553,980 | B2 | 2/2020 | Ogura | |
| 2018/0351297 | A1* | 12/2018 | Suzuki | H01R 13/2492 |
| 2019/0288440 | A1 | 9/2019 | Ogura | |
| 2020/0127417 | A1* | 4/2020 | Shimba | H01R 12/91 |
| 2021/0091498 | A1* | 3/2021 | Obata | H01R 13/113 |
| 2021/0104840 | A1* | 4/2021 | Doi | H01R 13/6315 |
| 2022/0320799 | A1 | 10/2022 | Ikegami | |

FOREIGN PATENT DOCUMENTS

| | | | |
|---|---|---|---|
| JP | H07230858 | A | 8/1995 |
| JP | 2009117058 | A | 5/2009 |
| JP | 2017098160 | A | 6/2017 |
| JP | 2019160698 | A | 9/2019 |
| WO | 2021045090 | A1 | 3/2021 |

OTHER PUBLICATIONS

Translation of Japanese Office Action for corresponding Japanese Patent Application No. 2021137632, dated Mar. 11, 2025, 7 pages.

* cited by examiner

CONNECTOR

CROSS-REFERENCE TO RELATED APPLICATION

This application claims priority to Japanese Patent Application No. 2021-137632 filed, on Aug. 25, 2021, the disclosure of which is incorporated herein by reference in its entirety.

BACKGROUND

Technical Field

The present disclosure relates to a connector.

Related Art

A connector as described in Japanese Patent Application Laid-Open (JP-A) No. 2017-98160 is known. The connector includes a movable housing that is displaceable with respect to an attachment object, and a terminal that electrically connects the attachment object and a connection object. The terminal has a displacement portion in which a contact portion in contact with the connection object is formed. The displacement portion is configured to be integrally displaced with the movable housing by being fixed to the movable housing.

In such a connector, when the connector is connected to the connection object, the movable housing and the displacement portion can be displaced in accordance with a positional deviation of the connection object.

SUMMARY OF THE INVENTION

However, in a case where the connector as described above is used under a vibration environment such as an automobile, for example, when the movable housing and the displacement portion are displaced by an inertial force, the contact portion formed in the displacement portion may repeatedly slide with respect to the connection object, or an elastically deformable intermediate deformation portion connected to the displacement portion may be repeatedly elastically deformed even if the contact portion does not slide. Such repeated sliding and elastic deformation may cause wear of the contact portion and breakage of the intermediate deformation portion.

In particular, when the frequency of a vibration of an engine of an automobile, a vibration from a road surface, or the like coincides with the resonance frequency of the displacement portion of the connector in a state of being connected to the connection object, the displacement portion will vibrate violently together with the connection object, so that the risk of the wear or the breakage described above increases. Therefore, in recent years, it is required to increase the resonance frequency of the displacement portion of the connector in the state of being connected to the connection object so that the frequency (natural frequency) of the displacement portion of the connector does not coincide with the frequency of the vibration of the engine of the automobile, the vibration from the road surface, or the like.

However, in the connector as described above, since the displacement portion of the terminal is fixed to the movable housing, when the displacement portion is displaced, the movable housing is also displaced integrally with the displacement portion. Therefore, the mass of a portion that is integrally displaced when the displacement portion is displaced is large. Therefore, the inertial force acting on the portion integrally displaced tends to increase, and the resonance frequency tends to decrease. As a result, it has not been possible to sufficiently meet the above requirement.

An object of the present disclosure is to provide a connector including a movable housing, the connector being capable of suppressing repeated sliding and the like between a contact portion and a connection object.

In the present disclosure, when a structure and/or a shape of an object are described, an X direction, a Y direction, and a Z direction, which are directional concepts based on the object and are mutually perpendicular, are used.

A connector according to a first aspect is a connector that is attachable to an attachment object, the connector including: a movable housing that is displaceable with respect to the attachment object in an X direction, which is a direction perpendicular to a connection direction of a connection object to the connector; and a terminal configured to electrically connect the attachment object and the connection object, in which the terminal includes a displacement portion that is formed with a contact portion configured to contact the connection object and that is displaceable with respect to the attachment object in the X direction, and the displacement portion is displaceable with respect to the movable housing.

In the above aspect, the connector includes the movable housing that is displaceable with respect to the attachment object in the X direction, which is a direction perpendicular to the connection direction, and the terminal configured to electrically connect the attachment object and the connection object. The terminal includes the displacement portion that is displaceable with respect to the attachment object in the X direction. The displacement portion is formed with the contact portion configured to contact the connection object.

As described above, since both the movable housing and the displacement portion can be displaced with respect to the attachment object in the X direction, the movable housing and the displacement portion can be displaced in accordance with a positional deviation of the connection object in the X direction when the connector and the connection object are connected.

Furthermore, in the above aspect, the displacement portion is displaceable with respect to the movable housing.

Therefore, unlike the above-described prior art (technique in which when the displacement portion is displaced, the movable housing is also displaced integrally with the displacement portion), the mass of the portion that is integrally displaced when the displacement portion is displaced is small. As a result, repeated sliding and the like (including repeated elastic deformation of an intermediate deformation portion when the terminal has the intermediate deformation portion) between the contact portion and the connection object can be suppressed.

A connector according to a second aspect is the connector according to the first aspect, in which the movable housing includes a movable-side limiting portion, and the movable-side limiting portion is configured such that when the movable housing is displaced in the X direction, the movable-side limiting portion abuts on the displacement portion, so that a position of the displacement portion in the X direction with respect to the movable housing is limited to a predetermined range.

Since the displacement portion is displaceable with respect to the movable housing, when the movable housing is displaced with respect to the attachment object, the displacement portion is displaced with respect to the movable housing.

Here, in the above aspect, the movable housing has the movable-side limiting portion. The movable-side limiting portion is configured such that when the movable housing is displaced in the X direction, the movable-side limiting portion abuts on the displacement portion, so that the position of the displacement portion in the X direction with respect to the movable housing is limited to a predetermined range.

Therefore, for example, by displacing the movable housing in accordance with the positional deviation of the connection object in the X direction prior to the contact between the connection object and the terminal, the displacement portion can be displaced in accordance with the positional deviation of the connection object in the X direction in advance prior to the contact between the connection object and the terminal. As a result, the distance of the positional deviation possible to be coped with can be increased as compared with an aspect in which the positional deviation of the connection object is coped with only by the structure of the terminal.

A connector according to a third aspect is the connector according to the first or second aspect, in which the movable housing is not displaceable with respect to the attachment object in a Y direction, which is a direction perpendicular to both the connection direction and the X direction.

In the above aspect, the movable housing is not displaceable with respect to the attachment object in the Y direction. Therefore, it is not necessary to provide a structure for displacing the movable housing in the Y direction, and as a result, for example, the connector can be downsized in the Y direction.

A connector according to a fourth aspect is the connector according to the third aspect that further includes a fixed housing configured to be fixed to the attachment object, in which the fixed housing includes a fixed-side limiting portion, and the fixed-side limiting portion is configured such that when the displacement portion is displaced in the Y direction, the fixed-side limiting portion abuts on the displacement portion, so that a position of the displacement portion in the Y direction with respect to the fixed housing is limited to a predetermined range.

In the above aspect, the connector includes the fixed housing configured to be fixed to the attachment object, and the fixed housing has the fixed-side limiting portion. That is, the position of the displacement portion in the Y direction with respect to the fixed housing is limited to a predetermined range by the fixed-side limiting portion of the fixed housing.

Therefore, in the manufacturing process of the connector, since the position of the displacement portion with respect to the fixed housing is determined to some extent before the movable housing is assembled to the fixed housing, assembling of the movable housing is facilitated.

A connector according to a fifth aspect is the connector according to any one of the first to fourth aspects, in which the contact portion is configured to contact the connection object so as to sandwich the connection object in the X direction.

In the above aspect, the contact portion is configured to contact the connection object so as to sandwich the connection object in the X direction. Therefore, the displacement portion can easily follow the positional deviation of the connection object in the X direction.

A connector according to a sixth aspect is the connector according to any one of the first to fifth aspects, in which the displacement portion includes: an elastic deformation portion that elastically deforms when the connection object is connected; and a deformation limiting portion that limits a deformation amount of the elastic deformation portion by abutting on the elastic deformation portion.

In the above aspect, the displacement portion includes the elastic deformation portion that elastically deforms when the connection object is connected. Therefore, the contact portion can be elastically brought into contact with the connection object.

However, since the displacement portion can be displaced with respect to the movable housing, it is difficult to limit the deformation of the elastic deformation portion by the movable housing.

Therefore, the displacement portion further includes a deformation limiting portion that limits the deformation amount of the elastic deformation portion by abutting on the elastic deformation portion. Therefore, excessive deformation of the displacement portion is limited by the deformation limiting portion, and the elastic deformation portion is prevented from being plastically deformed.

A connector according to a seventh aspect is the connector according to any one of the first to sixth aspects, in which the displacement portion includes: a first side plate and a second side plate both facing each other in the Y direction with plate thickness directions thereof oriented in the Y direction: a connecting plate that connects the first side plate and the second side plate in the Y direction with a plate thickness direction thereof oriented in the X direction, the connecting plate being in contact with the connection object from one side in the X direction: a contact piece base portion that extends from the first side plate toward the second side plate; and a contact piece that extends from the contact piece base portion and that elastically contacts the connection object from another side in the X direction, and in which a limiting hole is formed in the second side plate, and a distal end of the contact piece base portion is disposed in the limiting hole, so that a deformation amount of the contact piece base portion is limited.

In the above aspect, the limiting hole is formed in the second side plate, and the distal end of the contact piece base portion is disposed in the limiting hole, so that the deformation amount of the contact piece base portion is limited. As a result, the deformation limiting portion that limits the deformation amount of the elastic deformation portion including the contact piece base portion and the contact piece is realized with a simple configuration.

A connector according to an eighth aspect is the connector according to the first aspect, in which the movable housing includes a movable-side limiting portion, in which the movable-side limiting portion is configured such that when the movable housing is displaced in the X direction, the movable-side limiting portion abuts on the displacement portion, so that a position of the displacement portion in the X direction with respect to the movable housing is limited to a predetermined range, in which the displacement portion includes: a first side plate and a second side plate both facing each other in the Y direction with plate thickness directions thereof oriented in the Y direction: a connecting plate that connects the first side plate and the second side plate in the Y direction with a plate thickness direction thereof oriented in the X direction, the connecting plate being in contact with the connection object from one side in the X direction: a contact piece base portion that extends from the first side plate toward the second side plate; and a contact piece that extends from the contact piece base portion and that elastically contacts the connection object from another side in the X direction, in which both an end on the other side in the X direction of the first side plate and an end on the other side in the X direction of the second side plate are configured to be able to abut on the movable-side limiting portion, and in which the end on the other side in the X direction of the first side plate is located further toward the one side in the X direction than the end on the other side in the X direction of the second side plate.

In the above aspect, when the contact piece base portion extends from the first side plate and the contact piece extends from the contact piece base portion, the end on the other side in the X direction of the first side plate is located further toward the one side in the X direction than the end on the other side in the X direction of the second side plate. Therefore, when the displacement portion is produced by cutting and bending the plate material, the width dimension of the contact piece can be increased.

Further, both the end on another side in the X direction of the first side plate and the end on another side in the X direction of the second side plate are configured to be able to abut on the movable-side limiting portion. Therefore, the movable-side limited portion abuts on the displacement portion, so that the posture of the displacement portion is prevented from being collapsed.

A connector according to a ninth aspect is the connector according to any one of the first to eighth aspects, in which the terminal includes an avoidance portion extending from the displacement portion and extending in a direction away from a connection axis of the connection object.

In a mode in which a portion of the terminal extending from the displacement portion extends, for example, parallel to the connection axis of the connection object, the portion may collide with the distal end of the connection object.

Therefore, in the above aspect, the terminal includes the avoidance portion extending from the displacement portion and extending in a direction away from the connection axis of the connection object. Therefore, the collision as described above is prevented.

A connector according to a tenth aspect is the connector according to any one of the first to ninth aspects, in which the movable housing is supported by being in contact with the attachment object or a support member that is not displaced with respect to the attachment object.

In the first aspect, since the displacement portion is displaceable with respect to the movable housing, the movable housing cannot be appropriately supported by the displacement portion.

Therefore, in the above aspect, the movable housing is supported by being in contact with the attachment object or the support member that is not displaced with respect to the attachment object. Therefore, the movable housing can be appropriately supported.

In the embodiment described later, the support member is a fixed housing, but the support member is not limited to the fixed housing. The support member may be, for example, a portion of the terminal that is not displaced with respect to the attachment object.

A connector according to an eleventh aspect is the connector according to any one of the first to ninth aspects, in which the movable housing is supported by being in contact with a support member that is not displaced with respect to the attachment object, and one of the movable housing or the support member clamps another of the movable housing or the support member.

In the above aspect, one of the movable housing or the support member clamps another of the movable housing or the support member. Therefore, the movable housing is prevented from rattling with respect to the support member. When the rattling of the movable housing is prevented, for example, the following situation can be prevented: the movable housing collides with the connection object or the terminal in a rattling connection state, and as a result, the contact point between the terminal and the connection object is scraped due to being slid.

DETAILED DESCRIPTION OF THE INVENTION

Figure 1:
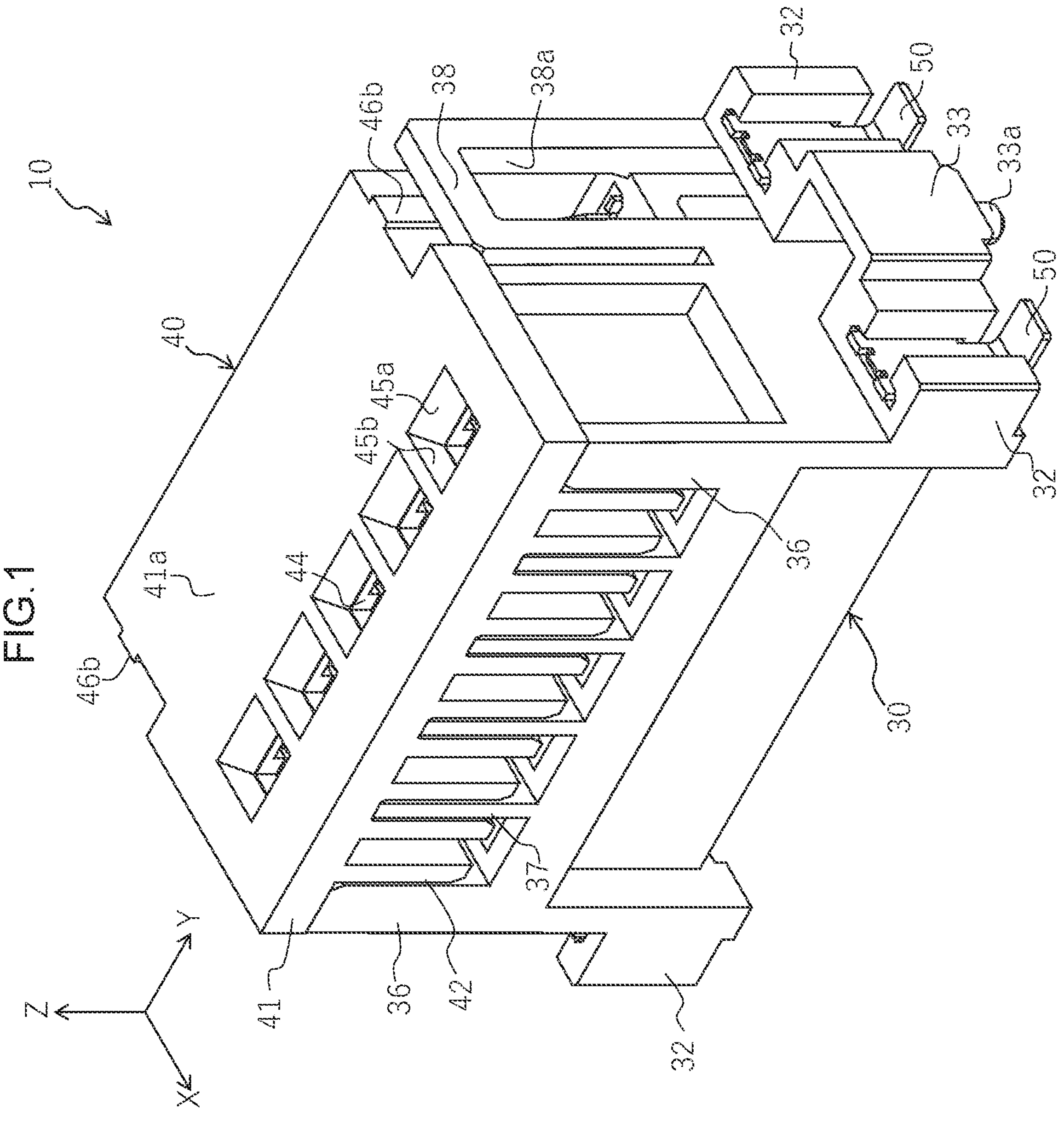
FIG. 1 is a perspective view of a connector.
Figure 2:
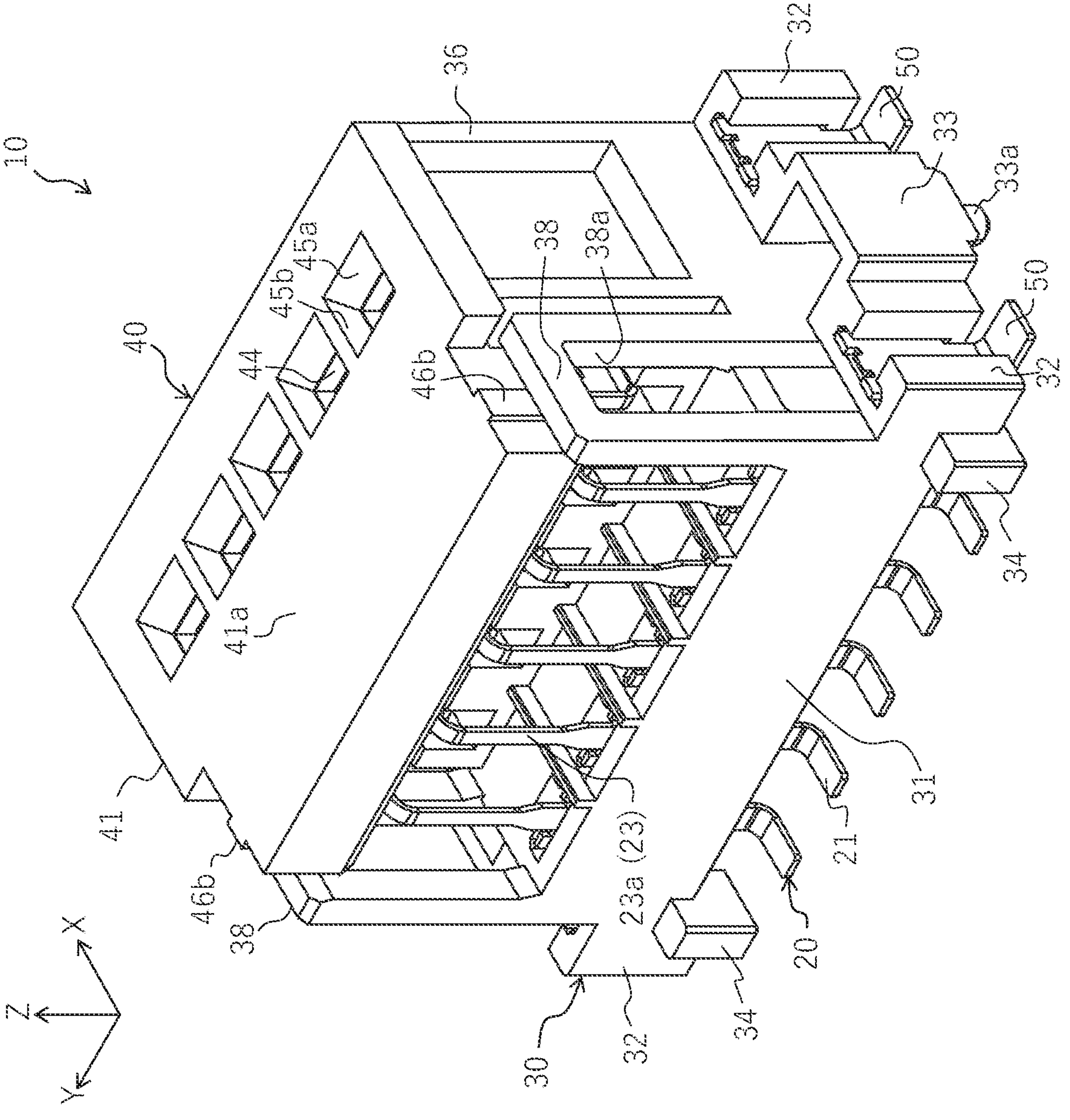
FIG. 2 is a perspective view of the connector as viewed from another direction.

Hereinafter, a connector 10 according to an embodiment of the present disclosure will be described.

For convenience of description, an X direction illustrated in each drawing may be referred to as a front-rear direction, a Y direction illustrated in each drawing may be referred to as a width direction (left-right direction), and a Z direction illustrated in each drawing may be referred to as a vertical direction. The terms indicating these directions are directional concepts based on the connector 10, and thus do not limit installation direction, posture, and the like at the time of using the connector 10.

FIGS. 1 to 4 illustrate the connector 10. The connector 10 includes a plurality of (five) terminals 20, a fixed housing 30, a movable housing 40, and a plurality of attachment fittings 50.

Figure 4:
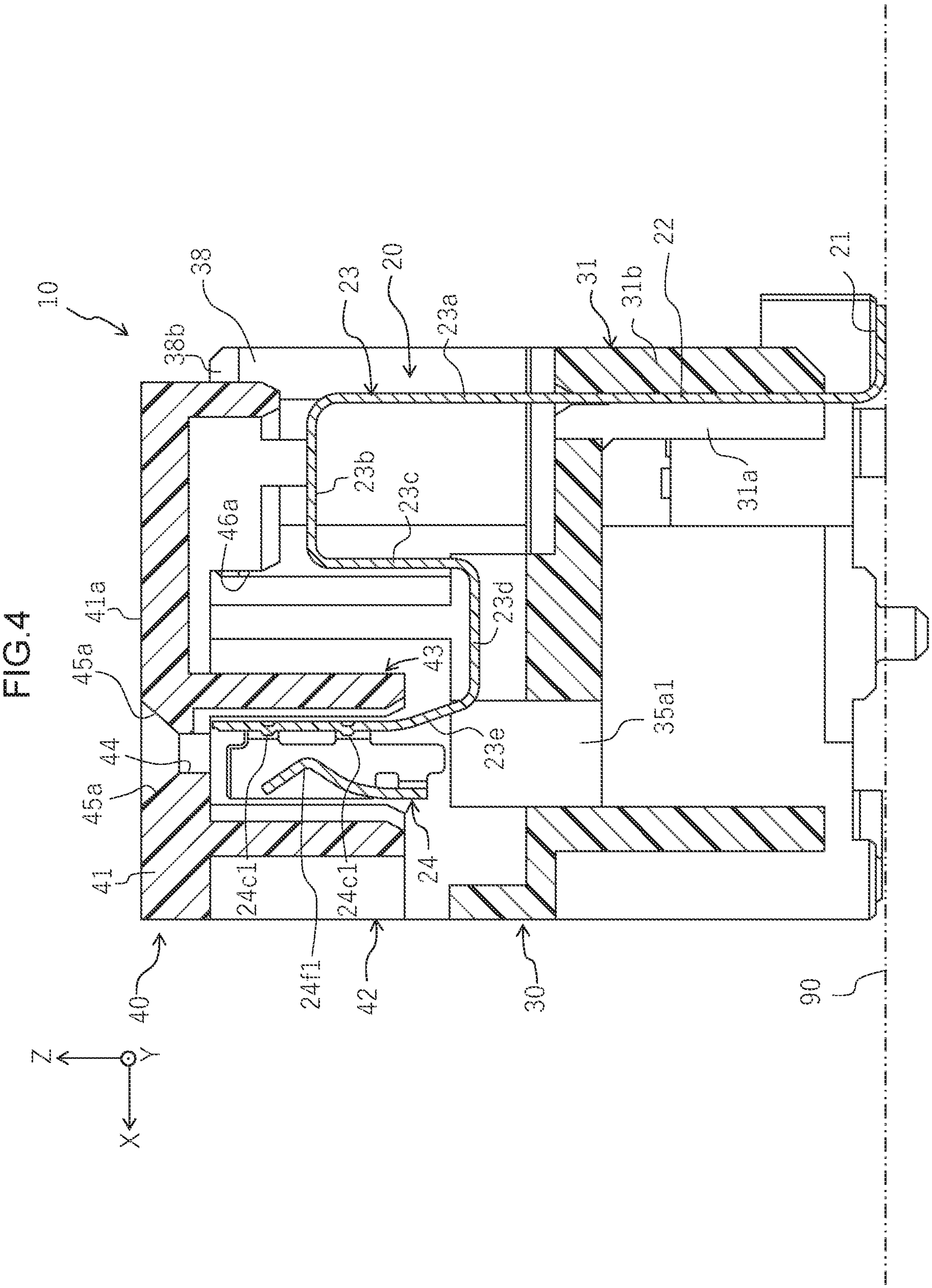
FIG. 4 is a cross-sectional view taken along line 4-4 in FIG. 3.

As illustrated in FIG. 4, the connector 10 is configured to be attachable to a board 90 as an "attachment object". In the present embodiment, the connector 10 is attached to the board 90 by soldering the plurality of terminals 20 and the plurality of attachment fittings 50 to the board 90.

The connector 10 is configured such that a mating terminal 80 (see FIGS. 11 to 13) as a "connection object" can be connected thereto. In the present embodiment, a plurality of (five) mating terminals 80 can be connected. The mating terminal 80 can be connected from above. That is, connection direction of the mating terminal 80 with respect to the connector 10 is a downward direction (−Z direction).

(Terminal 20)

Figure 5:
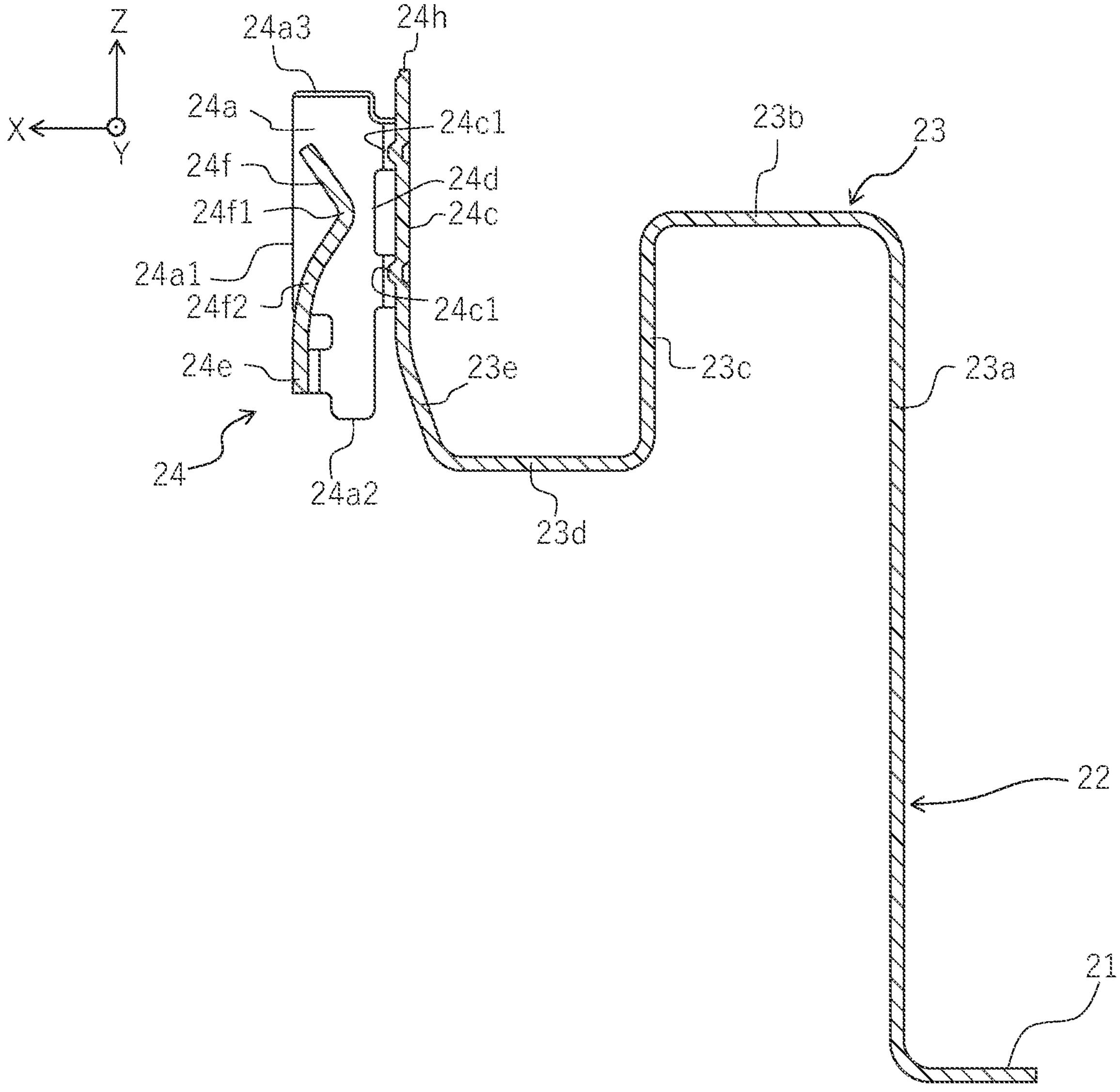
FIG. 5 is a cross-sectional view of a terminal.
Figure 6:
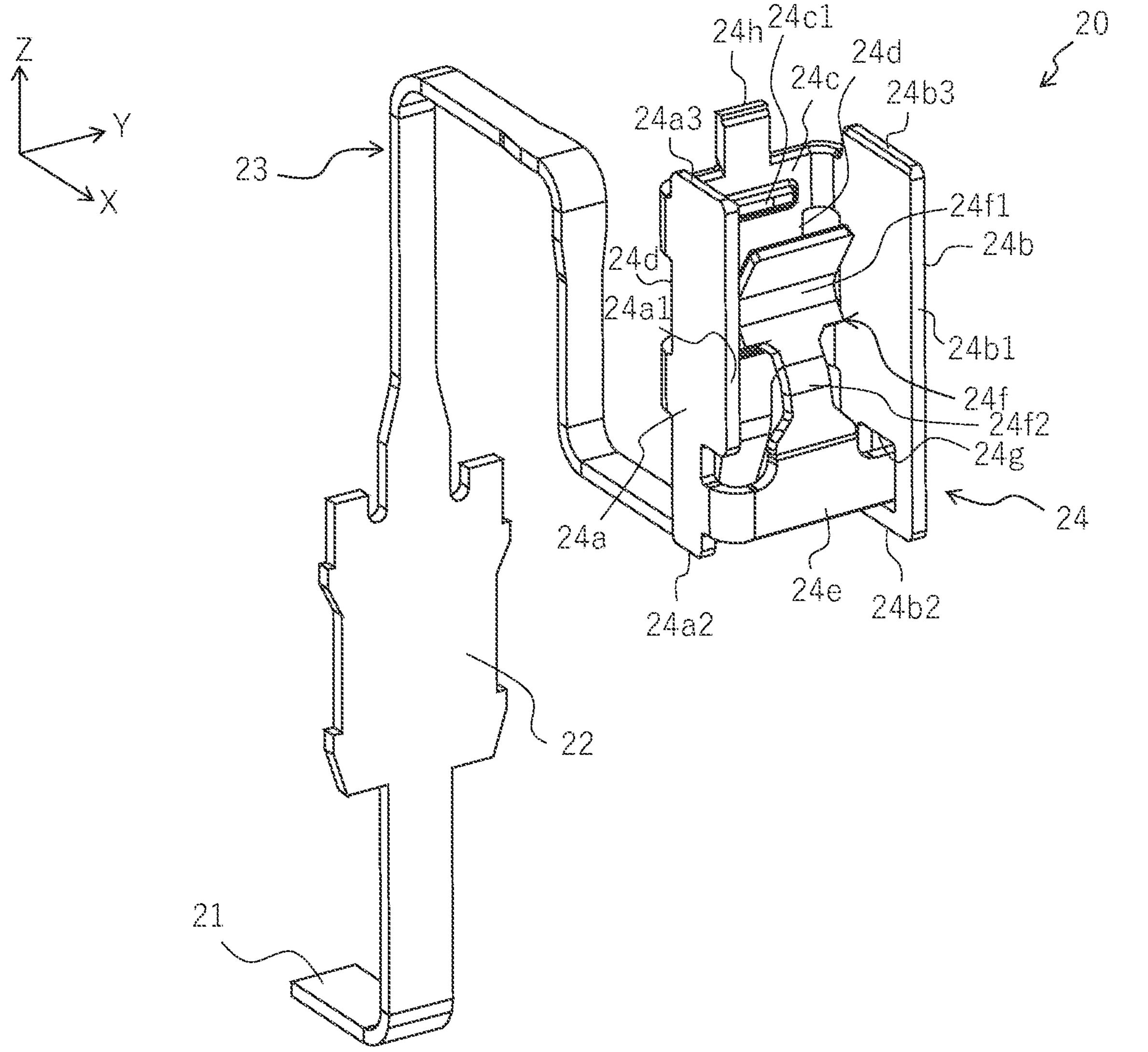
FIG. 6 is a perspective view of the terminal.

FIGS. 5 and 6 illustrate the terminal 20. The terminal 20 is formed of a conductive material and electrically connects the board 90 and the mating terminal 80.

The terminal 20 includes a board connecting portion 21, a held portion 22, an intermediate deformation portion 23, and a displacement portion 24 in this order.

The board connecting portion 21 is a portion to be connected to the board 90. The board connecting portion 21 is surface-mounted on the board 90 by soldering.

The held portion 22 is a portion held by the fixed housing 30. The held portion 22 is held by a terminal holding portion 31 of the fixed housing 30 by being press-fitted into the fixed housing 30. The held portion 22 is press-fitted into the fixed housing 30 from above. The held portion 22 has a plate thickness direction oriented in the front-rear direction.

The intermediate deformation portion 23 is a portion that is located between the held portion 22 and the displacement portion 24 and that is formed to be easily elastically deformed.

The displacement portion 24 is a portion that can be displaced with respect to the board connecting portion 21 and the held portion 22. Displacement of the displacement portion 24 is realized by deformation of the intermediate deformation portion 23. In the displacement portion 24, contact portions 24*c*1 and 24*f*1 that come into contact with the mating terminal 80 are formed.

The intermediate deformation portion 23 includes an upward direction portion 23*a*, a first forward direction portion 23*b*, a downward direction portion 23*c*, a second forward direction portion 23*d*, and an inclined direction portion 23*e* (an avoidance portion) in this order.

The upward direction portion 23*a* linearly extends upward from the held portion 22. The upward direction portion 23*a* is located at the same position as the held portion 22 in the front-rear direction.

The first forward direction portion 23*b* extends linearly in the forward direction from a curved portion formed on an upper side of the upward direction portion 23*a*. The first forward direction portion 23*b* is located above a bead 24*c*1 on the lower side described later.

The downward direction portion 23*c* linearly extends downward from a curved portion formed on a front side of the first forward direction portion 23*b*.

The second forward direction portion 23*d* extends linearly in the forward direction from a curved portion formed on a lower side of the downward direction portion 23*c*.

The inclined direction portion 23*e* linearly extends from a curved portion formed on a front side of the second forward direction portion 23*d* in an oblique direction of the forward direction and the upward direction. An angle formed by the direction in which the inclined direction portion 23*e* extends and the vertical direction is less than 45 degrees. A lower end of the inclined direction portion 23*e* is positioned below a lower end of the displacement portion 24, and an upper end of the inclined direction portion 23*e* is located above the lower end of the displacement portion 24.

The intermediate deformation portion 23 is formed by bending a plate material in the plate thickness direction. The plate thickness direction of the intermediate deformation portion 23 is directed in a direction perpendicular to the Y direction (a direction in a ZX plane) in the entire range.

As described above, in the intermediate deformation portion 23 of the present embodiment, a portion connecting the upward direction portion 23*a* and the downward direction portion 23*c* is configured by the first forward direction portion 23*b* and a pair of curved portions in front of and behind the first forward direction portion 23*b*. According to such a configuration, stress generated in the intermediate deformation portion 23 can be dispersed, as compared with a mode in which the portion connecting the upward direction portion 23*a* and the downward direction portion 23*c* is curved so as to draw a semicircular shape in a side view.

The displacement portion 24 includes a first side plate 24*a*, a second side plate 24*b*, and a connecting plate 24*c*.

The first side plate 24*a* and the second side plate 24*b* face each other in the width direction with the plate thickness direction oriented in the width direction.

The connecting plate 24*c* has a plate thickness direction oriented in the front-rear direction, and connects rear ends of the first side plate 24*a* and the second side plate 24*b* in the width direction. A lower end of the connecting plate 24*c* is connected to the intermediate deformation portion 23. Beads 24*c*1 extending in the width direction and protruding in the forward direction are formed at two locations on the connecting plate 24*c*. The bead 24*cl* functions as a first contact portion 24*c*1 that comes into contact with the mating terminal 80 from one side in the X direction (−X direction side in the present embodiment).

A curved portion formed between the first side plate 24*a* and the connecting plate 24*c* has a through hole 24*d* formed in the middle thereof in the vertical direction, and a curved portion formed between the second side plate 24*b* and the connecting plate 24*c* also has a through hole 24*d* formed in the middle thereof in the vertical direction. Since the rigidity is reduced by forming these through holes 24*d*, the curved portions can be formed with relatively small force.

The displacement portion 24 includes a contact piece base portion 24*e* and a contact piece 24*f*.

The contact piece base portion 24*e* extends from the first side plate 24*a* and extends in the width direction toward the second side plate 24*b*. A distal end of the contact piece base portion 24*e* is disposed in a limiting hole 24*g* formed in the second side plate 24*b*. In the free state, the contact piece base portion 24*e* extends substantially parallel to the Y direction toward the distal end side; and more specifically, the contact piece base portion 24*e* extends in a direction inclined slightly closer to the side of the connecting plate 24*c* (−X direction side), with respect to the Y direction.

The contact piece 24*f* extends upward from the contact piece base portion 24*e*. The contact piece 24*f* includes a mountain-shaped contact portion 24*f*1 on a distal end side and an elastic support portion 24*f*2 that supports the mountain-shaped contact portion 24*f*1. The mountain-shaped contact portion 24*f*1 is formed by being bent in a mountain shape so as to protrude toward the mating terminal 80. The vertex of the mountain-shaped contact portion 24*f*1 is located between the two beads 24*c*1 of the connecting plate 24*c* in the vertical direction. The width dimension of the elastic support portion 24*f*2 is smaller than the width dimension of the mountain-shaped contact portion 24*f*1. The terminal 20 is configured to be in contact with the mating terminal 80 at three points which are the two beads 24*c*1 as the first contact portion 24*c*1 of the connecting plate 24*c* and the mountain-shaped contact portion 24*f*1 as a second contact portion.

Further, the two beads 24*c*1 of the connecting plate 24*c* as the first contact portion 24*c*1 and the mountain-shaped contact portion 24*f*1 as the second contact portion are formed such that the width dimensions thereof are larger than the width dimension of the mating terminal 80. As a result, the displacement portion 24 is configured such that the mating terminal 80 and the contact portions **24*c*1 and 24*f*1 appropriately come into contact with each other even if the position of the mating terminal 80** in the Y direction is deviated.

The first side plate **24*a* has a front end edge 24*a*1 extending in the vertical direction. The front end edge 24*a*1 of the first side plate 24*a* abuts on the movable housing 40 when the displacement portion 24 is displaced in the forward direction with respect to the movable housing 40**.

The first side plate **24*a* has smaller front-rear dimension in a lower portion thereof than in an upper portion thereof. The contact piece base portion 24*e* extends from a front end edge of the lower portion of the first side plate 24*a* via the curved portion. The above-described front end edge 24*a*1 is a front end edge of the upper portion of the first side plate 24*a*. The length (vertical length) of the front end edge 24*a*1 exceeds 50% of the vertical dimension of the first side plate 24*a***.

The second side plate **24*b* has a front end edge 24*b*1 extending in the vertical direction. The front end edge 24*b*1 of the second side plate 24*b* abuts on the movable housing 40 when the displacement portion 24 is displaced in the forward direction with respect to the movable housing 40**.

Unlike the first side plate **24*a*, the second side plate 24*b* has a constant front-rear dimension over the vertical direction. The front end edge 24*b*1 of the second side plate 24*b* is formed from a lower end to the upper end of the second side plate 24*b***.

The front end edge **24*b*1 of the second side plate 24*b* is located in front of the front end edge 24*a*1 of the first side plate 24*a***.

The first side plate **24*a* has a lower end edge 24*a*2 extending in the front-rear direction. The lower end edge 24*a*2 of the first side plate 24*a* abuts on the fixed housing 30 when the displacement portion 24 is displaced in the downward direction with respect to the fixed housing 30**.

The second side plate **24*b* has a lower end edge 24*b*2 extending in the front-rear direction. The lower end edge 24*b*2 of the second side plate 24*b* abuts on the fixed housing 30 when the displacement portion 24 is displaced in the downward direction with respect to the fixed housing 30**.

The lower end edge **24*a*2 of the first side plate 24*a* and the lower end edge 24*b*2 of the second side plate 24*b* are formed at the same position in the vertical direction. The lower end edge 24*a*2 of the first side plate 24*a* and the lower end edge 24*b*2 of the second side plate 24*b* are located below the upper end of the inclined direction portion 23*e* of the intermediate deformation portion 23 and above the lower end of the inclined direction portion 23*e***.

The first side plate **24*a* has an upper end edge 24*a*3 extending in the front-rear direction. The upper end edge 24*a*3 of the first side plate 24*a* abuts on a lower surface 41*b* (see FIG. 11) of a top wall 41 of the movable housing 40 when the displacement portion 24 is displaced in the upward direction with respect to the movable housing 40**.

The second side plate **24*b* has an upper end edge 24*b*3 extending in the front-rear direction. The upper end edge 24*b*3 of the second side plate 24*b* abuts on the lower surface 41*b* of the top wall 41 of the movable housing 40 when the displacement portion 24 is displaced in the upward direction with respect to the movable housing 40**.

The upper end edge **24*a*3 of the first side plate 24*a* and the upper end edge 24*b*3 of the second side plate 24*b*** are formed at the same position in the vertical direction.

A carrier cutting portion **24*h* protrudes upward from the upper end of the connecting plate 24*c*. The carrier cutting portion 24*h* is a connection portion between the terminal 20 and a carrier in a case where the terminal 20 is formed by performing a forward feed processing. An upper end of the carrier cutting portion 24*h* is located above the upper end edge 24*a*3 of the first side plate 24*a* and the upper end edge 24*b*3 of the second side plate 24*b*. A recessed portion 41*d* (see FIG. 11) recessed upward is formed on the upper side of a position where the carrier cutting portion 24*h* is disposed in the movable housing 40. As a result, even when the displacement portion 24 is displaced in the upward direction, the carrier cutting portion 24*h* does not abut on the movable housing 40**.

(Fixed Housing 30)

The fixed housing 30 is integrally formed of an insulator such as synthetic resin.

The fixed housing 30 is fixed to the board 90 and is not displaced with respect to the board 90. Specifically, the fixed housing 30 is attached to the board 90 via the plurality of terminals 20 and the plurality of attachment fittings 50.

The fixed housing 30 includes the terminal holding portion 31 that holds the held portion 22 of the terminal 20.

Figure 8:
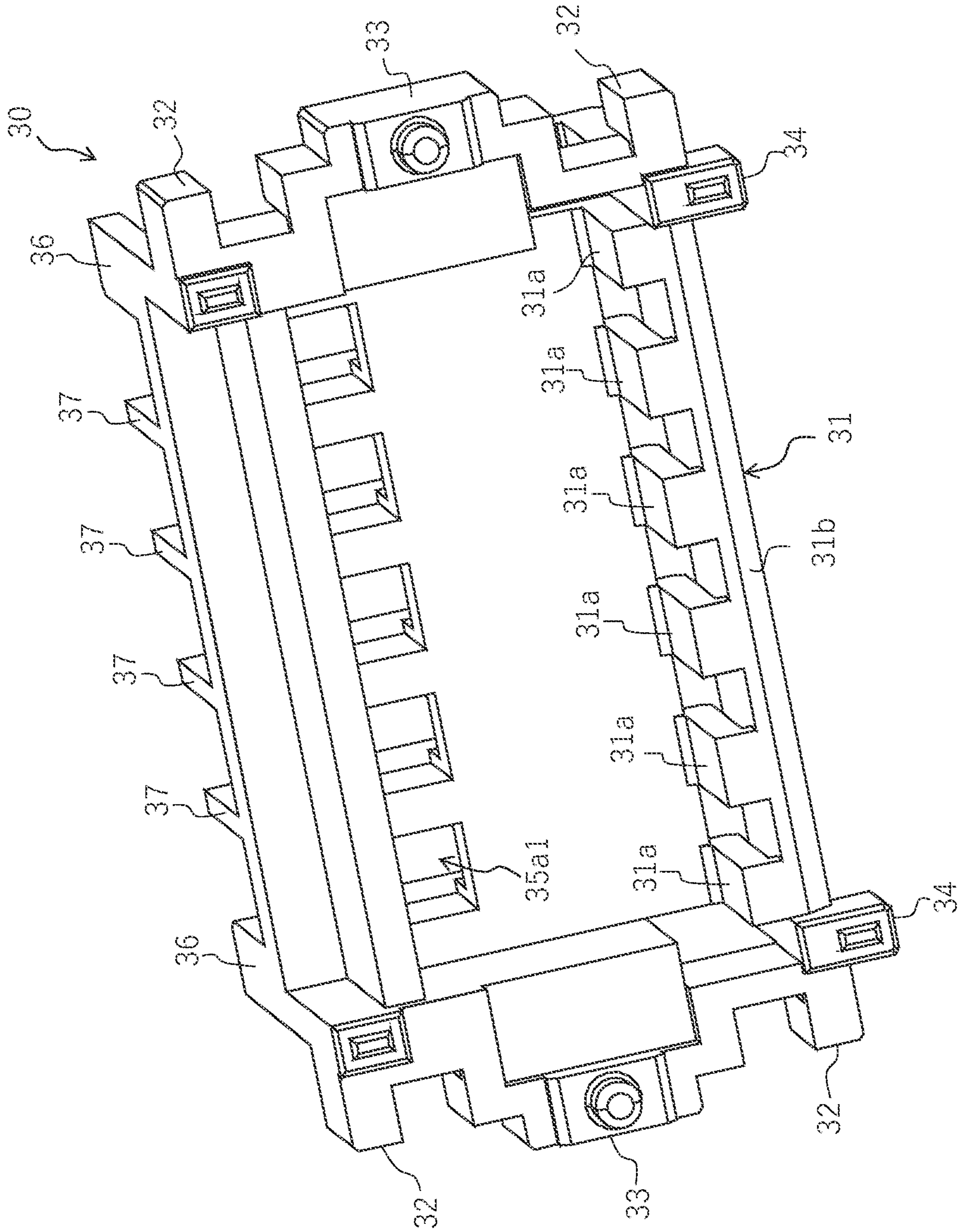
FIG. 8 is a perspective view of a fixed housing as viewed from below.

As illustrated in FIG. 8, the terminal holding portion 31 has a plurality of (six) press-fitted walls **31*a*. The plurality of press-fitted walls 31*a* are arranged side by side in a terminal arrangement direction (Y direction). The held portion 22 of the terminal 20 is press-fitted between the adjacent press-fitted walls 31*a***.

The terminal holding portion 31 has a connecting wall **31*b*. The connecting wall 31*b* connects the plurality of press-fitted walls 31*a* in the terminal arrangement direction. The connecting wall 31*b* is formed on an outer side in the front-rear direction (in the present embodiment, on the rear side or −X direction side) with respect to the plurality of press-fitted walls 31*a***.

A direction in which the terminal 20 is assembled to the fixed housing 30 is the downward direction. Therefore, when the held portion 22 of the terminal 20 is press-fitted between the press-fitted walls **31*a* of the fixed housing 30, the board connecting portion 21 of the terminal 20 will interfere with the connecting wall 31*b*. Therefore, in the present embodiment, at the stage where the terminal 20 is assembled to the fixed housing 30, the board connecting portion 21 of the terminal 20 is not formed, and a portion to be the board connecting portion 21 extends straight downward from the held portion 22. After the held portion 22 of the terminal 20 is press-fitted between the press-fitted walls 31*a* of the fixed housing 30, the portion to be the board connecting portion 21 is bent to complete the terminal 20**.

The fixed housing 30 includes attachment fitting holding portions 32 that hold the attachment fittings 50.

The attachment fitting holding portions 32 are formed at outer positions in the width direction of the fixed housing 30. The total number of the attachment fitting holding portions 32 is four. Two of the four attachment fitting holding portions 32 are formed on the front side with respect to the center position in the front-rear direction of the fixed housing 30, and the other two are formed on the rear side with respect to the center position in the front-rear direction of the fixed housing 30.

Figure 3:
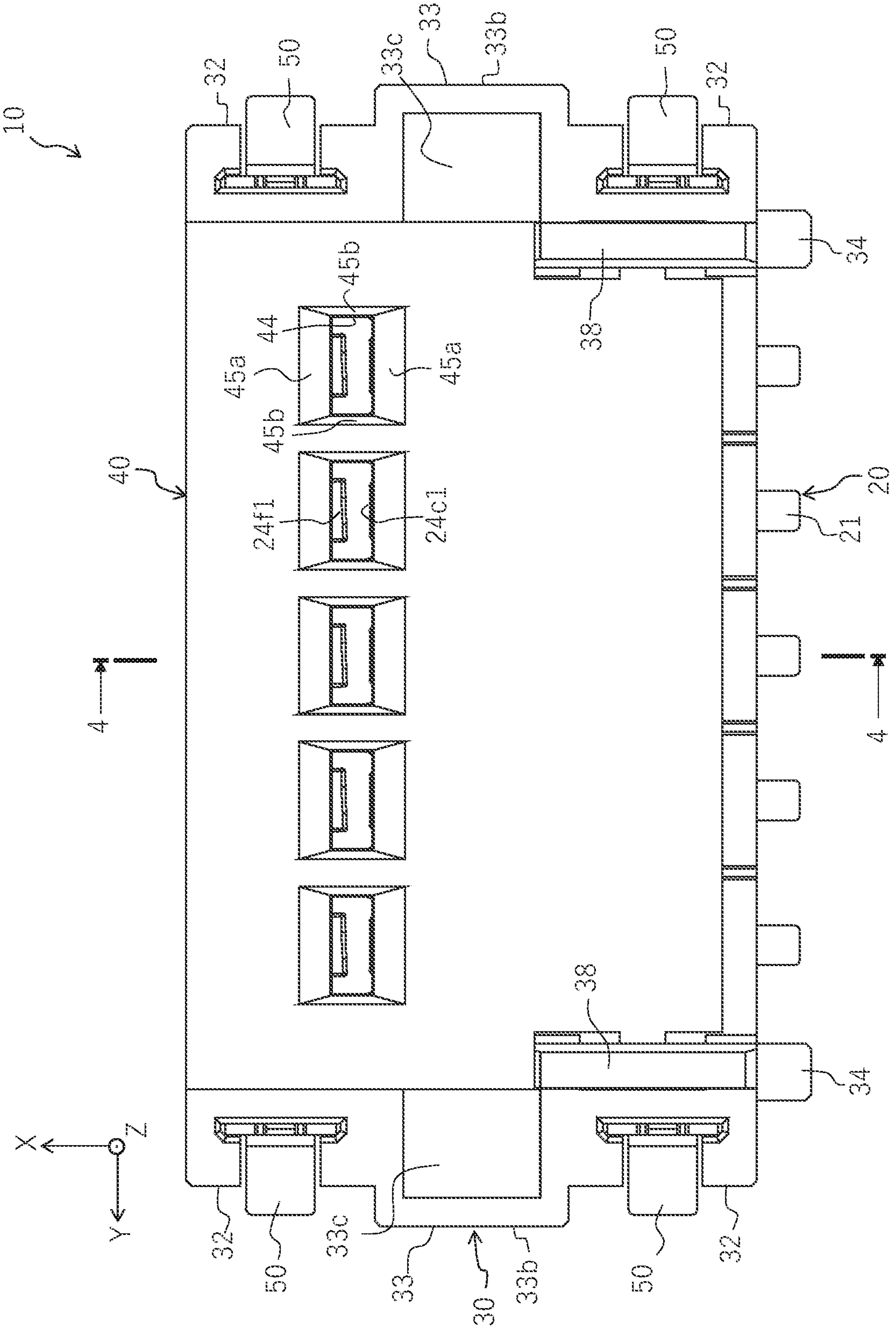
FIG. 3 is a top view of the connector.

The fixed housing 30 has a reinforcing portion 33 formed between the front attachment fitting holding portion 32 and the rear attachment fitting holding portion 32. A positioning boss **33*a* is formed on a lower surface side of the reinforcing portion 33. As illustrated in FIG. 3, a side surface 33*b* of the reinforcing portion 33 is located on an outer side in the width direction with respect to the distal end (an outer end in the width direction) of a tail portion of the attachment fitting 50**.

On an upper surface of the reinforcing portion 33, a recessed portion 33*c* recessed downward is formed.

The fixed housing 30 has tail protection portions 34. A pair of tail protection portions 34 are formed. As illustrated in FIG. 3, the plurality of board connecting portions 21 included respectively in the plurality of terminals 20 are disposed between the pair of tail protection portions 34.

Figure 7:
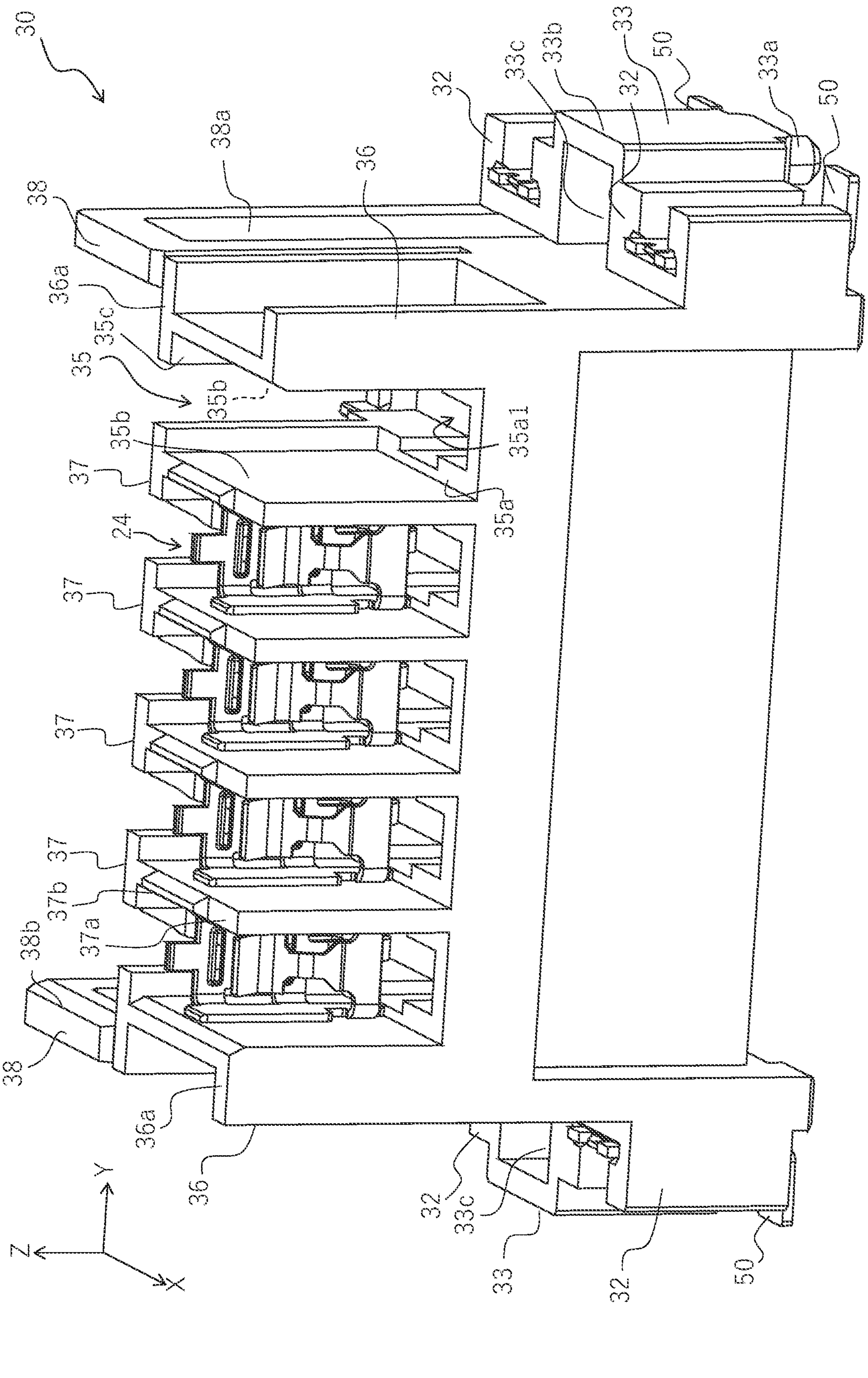
FIG. 7 is a perspective view of the connector in which a movable housing and one of a plurality of terminals are omitted.

As illustrated in FIG. 7, the fixed housing 30 has arrangement spaces 35 in which the displacement portion 24 of the terminal 20 and movable-side limiting portions 42 and 43 to be described later are arranged. A plurality of (five) arrangement spaces 35 are formed in accordance with the number of terminals 20.

The arrangement space 35 is formed by an arrangement bottom surface 35*a*, a pair of arrangement side surfaces 35*b*, and an arrangement rear surface 35*c*.

The arrangement bottom surface 35*a* is configured such that the displacement portion 24 displaced in the downward direction abuts on it. Specifically, the arrangement bottom surface 35*a* is configured such that the lower ends 24*a*2 and 24*b*2 of both of the pair of side plates (the first side plate 24*a* and the second side plate 24*b*) of the displacement portion 24 displaced in the downward direction simultaneously abut on the arrangement bottom surface 35*a*. When the mating terminal 80 is connected to the connector 10, the displacement portion 24 receives a downward force from the mating terminal 80 and is displaced in the downward direction to abut on the arrangement bottom surface 35*a* (not illustrated). Consequently, the displacement portion 24 is not further displaced in the downward direction, and the mating terminal 80 is connected to the displacement portion 24. The arrangement bottom surface 35*a* is a plane whose normal direction is directed upward.

Incidentally, in a state where the connector 10 and the mating terminal 80 are connected, the displacement portion 24 is basically not in contact with the arrangement bottom surface 35*a*.

There is a case where the mating terminal 80 is temporarily displaced in the downward direction with respect to the connector 10 due to some cause (vertical vibration of the mating terminal 80 or the like). When the mating terminal 80 is temporarily displaced in the downward direction with respect to the connector 10, the insertion of the mating terminal 80 into the displacement portion 24 of the terminal 20 becomes deeper. Then, when the temporary downward displacement of the mating terminal 80 is released and returns to the normal position, the displacement portion 24 is displaced in the upward direction together with the mating terminal 80. In a state immediately after the mating terminal 80 is connected to the connector 10, there is a possibility that the displacement portion 24 is in contact with the arrangement bottom surface 35*a*. However, due to the above phenomenon, in the connection state, the displacement portion 24 is basically not in contact with the arrangement bottom surface 35*a*.

The arrangement side surface 35*b* is configured such that the displacement portion 24 displaced in the width direction abuts on it. Specifically, the arrangement side surface 35*b* is configured such that the outer side surfaces in the width direction of the pair of side plates (the first side plate 24*a* and the second side plate 24*b*) of the displacement portion 24 displaced in the width direction abut on the arrangement side surface 35*b*. The arrangement side surface 35*b* is a plane whose normal direction is directed in the width direction. The displacement portion 24 is not in contact with the arrangement side surface 35*b* in a normal connection state.

The plurality of arrangement side surfaces 35*b* and the plurality of arrangement rear surfaces 35*c* forming the plurality of arrangement spaces 35 are configured by a pair of side walls 36 and a plurality of (four) partition walls 37 of the fixed housing 30.

The top wall 41 of the movable housing 40 is in contact with an upper surface 36*a* of the side wall 36.

Each of the plurality of partition walls 37 is disposed between adjacent ones of a plurality of displacement portions 24. Each of the plurality of partition walls 37 has the same structure.

An upper surface 37*a* of the partition wall 37 has the same height as the upper surface 36*a* of the side wall 36. A guide protruding portion 37*b* protruding upward is formed from the upper surface 37*a* of the partition wall 37.

Of the upper surface 37*a* of the partition wall 37, a portion located on the front side of the guide protruding portion 37*b* is in contact with the top wall 41 of the movable housing 40.

A confirming hole 35*a*1 is formed in the arrangement bottom surface 35*a*. The confirming hole 35*a*1 is a hole for making the displacement portion 24 of the terminal 20 visible from the lower side of the connector 10. By confirming the displacement portion 24 through the confirming hole 35*al*, the connection state between the displacement portion 24 and the connection object 80 can be confirmed. The confirming hole 35*a*1 is formed in such a size that it is possible to confirm the connection state between the displacement portion 24 and the connection object 80 even in a state where the displacement portion 24 is displaced to a displaceable limit position.

The fixed housing 30 has a housing front abutting portion on which the movable housing 40 abuts when the movable housing 40 is displaced in the forward direction. As a result, the moving range of the movable housing 40 in the forward direction with respect to the fixed housing 30 is limited. In the present embodiment, the pair of side walls 36 functions as the housing front abutting portion.

The fixed housing 30 has a housing rear abutting portion on which the movable housing 40 abuts when the movable housing 40 is displaced in the backward direction. As a result, the moving range of the movable housing in the backward direction with respect to the fixed housing 30 is limited. In the present embodiment, the pair of side walls 36 and the plurality of partition walls 37 function as the housing rear abutting portion. Specifically, the arrangement rear surface 35*c* formed on the pair of side walls 36 and the plurality of partition walls 37 functions as the housing rear abutting portion. The arrangement rear surface 35*c* abuts on a second abutting wall 43 of the movable housing 40.

The fixed housing 30 has a pair of clamping portions 38. The pair of clamping portions 38 are portions that clamp the movable housing 40.

The pair of clamping portions 38 is configured such that a distance between the pair of clamping portions 38 can be slightly increased. Specifically, each of the pair of clamping portions 38 is formed in a cantilever shape extending in the upward direction. The clamping portion 38 clamps the movable housing 40 on its distal end side (free end side).

A through hole 38*a* penetrating the clamping portion 38 in the width direction is formed in the clamping portion 38. As a result, the clamping portion 38 is easily deformed, and a locked portion 46*c* of the movable housing 40 described later can be locked.

An inclined guide surface 38*b* is formed in the clamping portion 38. As a result, the movable housing 40 easily enters between the pair of clamping portions 38.

(Movable Housing 40)

The movable housing 40 is integrally formed of an insulator such as synthetic resin.

The movable housing 40 has a top wall 41 constituting an upper portion of the movable housing 40.

The movable housing 40 has a plurality of insertion ports 44 into which the mating terminal 80 is inserted. Since the mating terminal 80 and the terminal 20 come into contact with each other inside the insertion port 44, dustproofness is secured. The insertion port 44 penetrates the top wall 41 in the vertical direction.

As illustrated in FIG. 3, the insertion port 44 has a rectangular shape with the X direction as the short side direction and the Y direction as the long side direction when viewed from the Z direction which is the connection direction. The dimension of the insertion port 44 in the X direction is slightly larger than the dimension of the mating terminal 80 in the X direction, for example, is from 1.05 to 1.15 times the dimension of the mating terminal 80 (see FIG. 13). The dimension of the insertion port 44 in the Y direction is twice or more the dimension of the mating terminal 80 in the Y direction. Note that the cross-sectional shape of the mating terminal 80 is a square.

As a result, the insertion port 44 has a dimension with a small margin with respect to the mating terminal 80 in the direction in which the movable housing 40 can be displaced (X direction), and has a dimension with a large margin with respect to the mating terminal 80 in the direction in which the movable housing 40 cannot be displaced (Y direction).

The movable housing 40 has inclined surfaces 45*a* and 45*b*. The inclined surfaces 45*a* and 45*b* are formed corresponding to the plurality of insertion ports 44, respectively.

The inclined surfaces 45*a* and 45*b* have an X-direction inclined surface 45*a* and a Y-direction inclined surface 45*b*.

Figure 11:
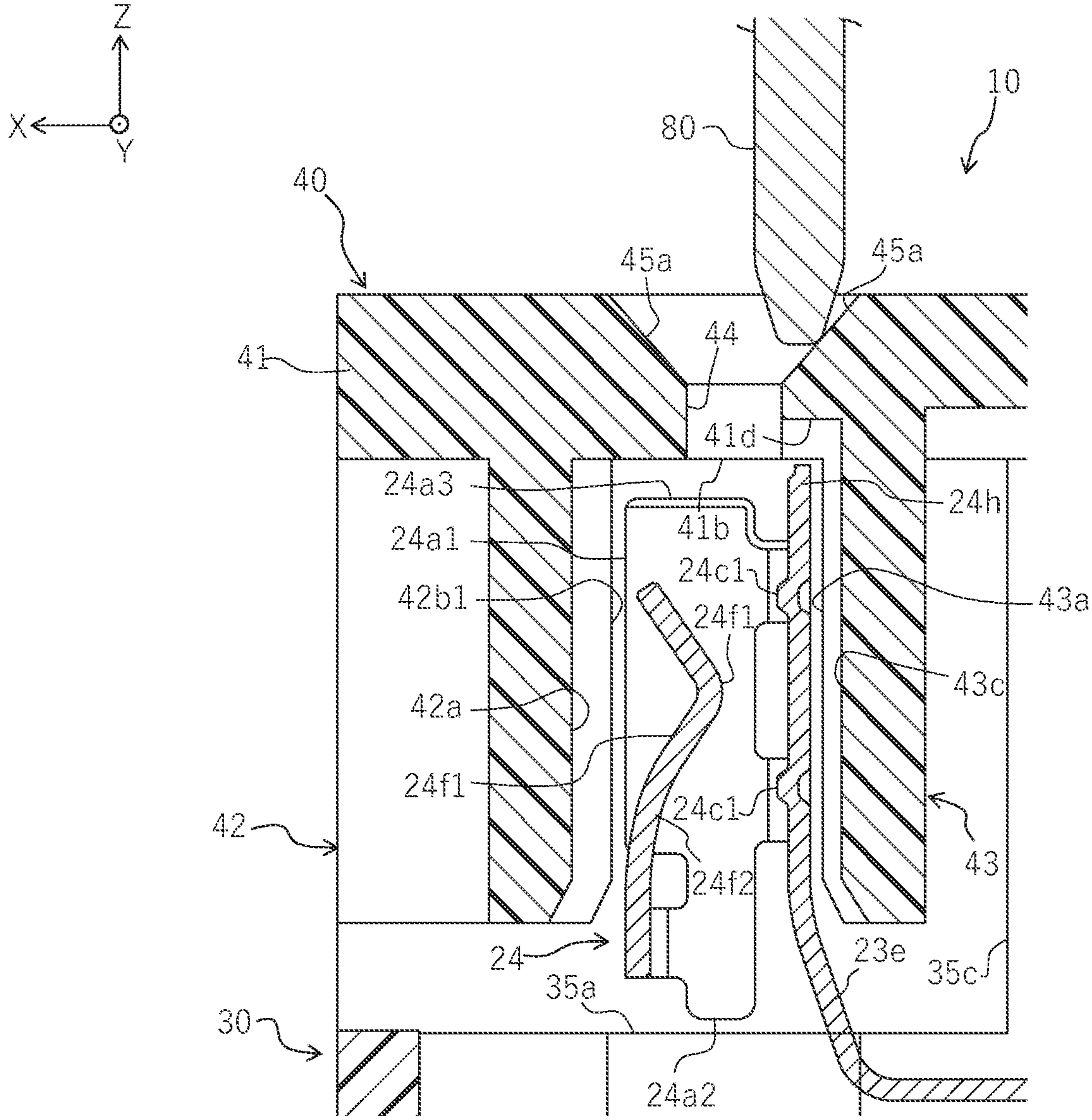
FIG. 11 is a cross-sectional view illustrating a state at the moment when a connection object whose position is deviated comes into contact with the movable housing.

The X-direction inclined surfaces 45*a* are formed on both sides, i.e., the +X direction side and the −X direction side, of the insertion port 44. The X-direction inclined surface 45*a* is a plane whose normal direction is directed in the +Z direction inclined toward the X direction. For example, as illustrated in FIG. 11, when the mating terminal 80 is to be inserted in a state in which its position is deviated in the −X direction with respect to the insertion port 44, the distal end of the mating terminal 80 abuts on the X-direction inclined surface 45*a* on the −X direction side of the insertion port 44. When the insertion is continued as it is, the movable housing 40 receives a force in the −X direction from the mating terminal 80 via the X-direction inclined surface 45*a*. By this force, the movable housing 40 is displaced in the −X direction. That is, the X-direction inclined surface 45*a* functions to eliminate a positional deviation in the X direction between the movable housing 40 and the mating terminal 80.

The Y-direction inclined surface 45*b* is an inclined surface for facilitating removal of the metal mold for forming the insertion port 44 at the time of resin molding of the movable housing 40. The dimension of the Y-direction inclined surface 45*b* in the Y direction is smaller than the dimension of the X-direction inclined surface 45*a* in the X direction, and is specifically 0.4 times or less the dimension of the X-direction inclined surface 45*a* in the X direction.

The inclined surfaces 45*a* and 45*b* are formed so as to connect an upper surface 41*a* of the top wall 41 and an upper end of the insertion port 44.

The movable housing 40 has upward direction contact surfaces 41*b* and 41*c* (see FIG. 9) that are in contact with the fixed housing 30 from above.

The upward direction contact surfaces 41*b* and 41*c* are planes whose normal direction is directed downward. The upward direction contact surfaces 41*b* and 41*c* are a lower surface of the top wall 41. The upward direction contact surfaces 41*b* and 41*c* include a pair of first upward direction contact surfaces 41*b* located on the outer side in the width direction with respect to a plurality of first abutting walls 42 and a plurality of second abutting walls 43, and a plurality of (four) second upward direction contact surfaces 41*c* located between the adjacent first abutting walls 42. The first upward direction contact surface 41*b* is in contact with the upper surfaces 36*a* of the pair of side walls 36 of the fixed housing 30. The second upward direction contact surface 41*c* is in contact with the upper surface 37*a* of the partition wall 37 of the fixed housing 30. The upper surfaces 36*a* of the pair of side walls 36 and the upper surfaces 37*a* of the plurality of partition walls 37 are in contact with the movable housing 40, so that the posture of the movable housing 40 with respect to the fixed housing 30 is stabilized.

The movable housing 40 includes movable-side limiting portions 42 and 43. The movable-side limiting portions 42 and 43 are configured such that when the movable housing 40 is displaced in the X direction, the movable-side limiting portions 42 and 43 abut on the displacement portion 24, so that the position of the displacement portion 24 in the X direction with respect to the movable housing 40 is limited to a predetermined range. As a result, when the movable housing 40 is displaced in the front-rear direction, the displacement portion 24 follows the movable housing 40 to some extent.

The movable-side limiting portions 42 and 43 include a plurality of first abutting walls 42 and a plurality of second abutting walls 43.

Each of the plurality of second abutting walls 43 is located behind each of the plurality of first abutting walls 42. The displacement portion 24 is disposed behind the first abutting wall 42 and in front of the second abutting wall 43. The displacement portion 24 can be displaced to a certain extent in the front-rear direction between the first abutting wall 42 and the second abutting wall 43.

Figure 10:
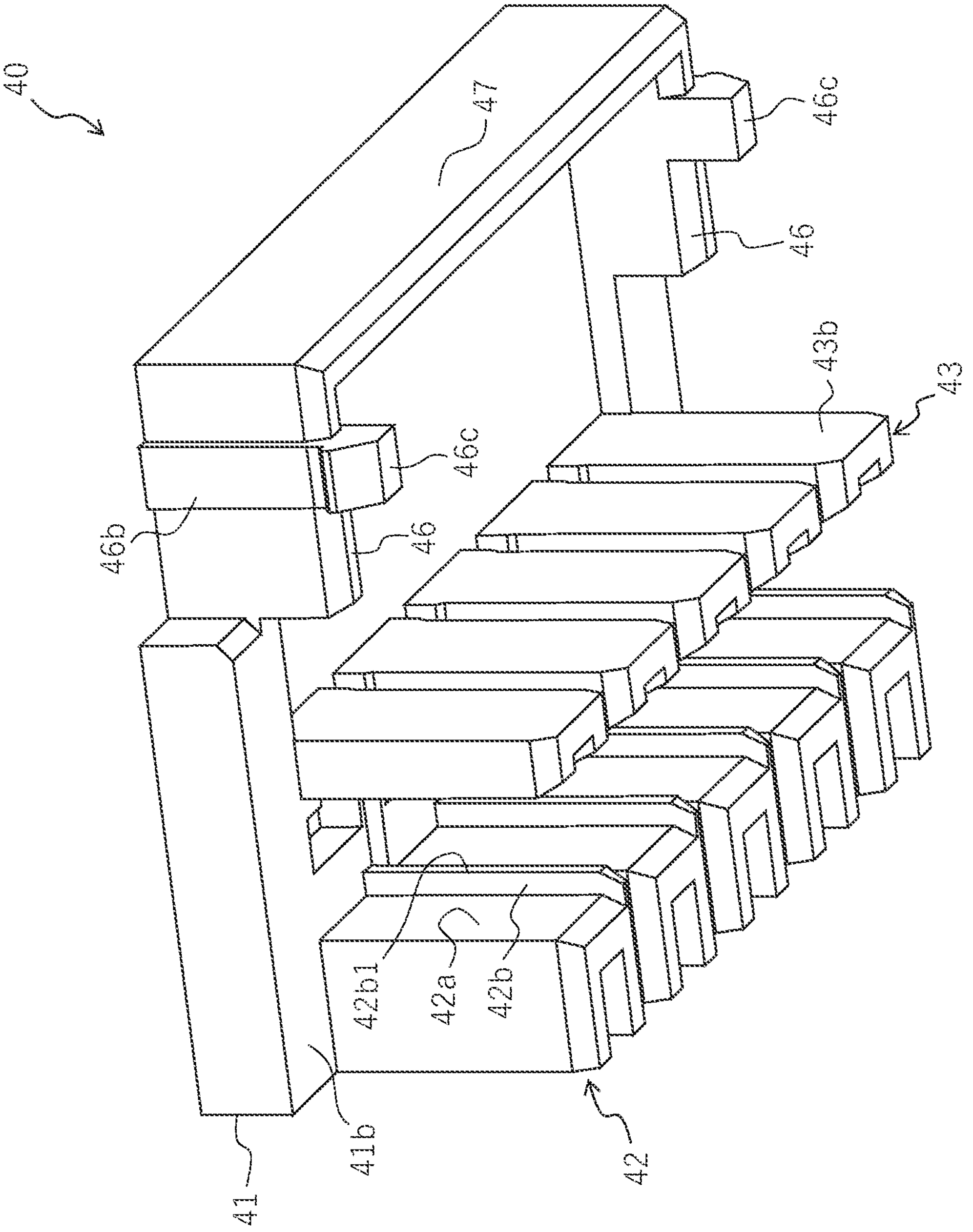
FIG. 10 is a perspective view of the movable housing as viewed from a rear side.

As illustrated in FIG. 10, the first abutting wall 42 has a general rear surface 42*a*. The general rear surface 42*a* of the first abutting wall 42 is a plane whose normal direction is directed in the backward direction. The general rear surface 42*a* of the first abutting wall 42 is configured to be able to abut on the second side plate 24*b* of the displacement portion 24. As illustrated in FIG. 11, the general rear surface 42*a* faces the contact piece 24*f* in the front-rear direction.

The first abutting wall 42 has a protruding rear surface 42*b*1. The protruding rear surface 42*b*1 is configured to be able to abut on the first side plate 24*a* of the displacement portion 24. The protruding rear surface 42*b*1 is a plane whose normal direction is directed in the backward direction. The protruding rear surface 42*b*1 is located on the rear side with respect to the general rear surface 42*a*. The gap between the protruding rear surface 42*b*1 and the first side plate 24*a* of the displacement portion 24 in the front-rear direction is the same as the gap between the general rear surface 42*a* and the second side plate 24*b* of the displacement portion 24 in the front-rear direction.

The first abutting wall 42 is formed with a protruding portion 42*b* protruding backward from the general rear surface 42*a*. The protruding portion 42*b* is formed at the right end of the first abutting wall 42. The protruding portion 42*b* is formed from the upper end to the lower end of the first abutting wall 42. The protruding rear surface 42*b*1 is formed on the protruding portion 42*b*.

Figure 9:
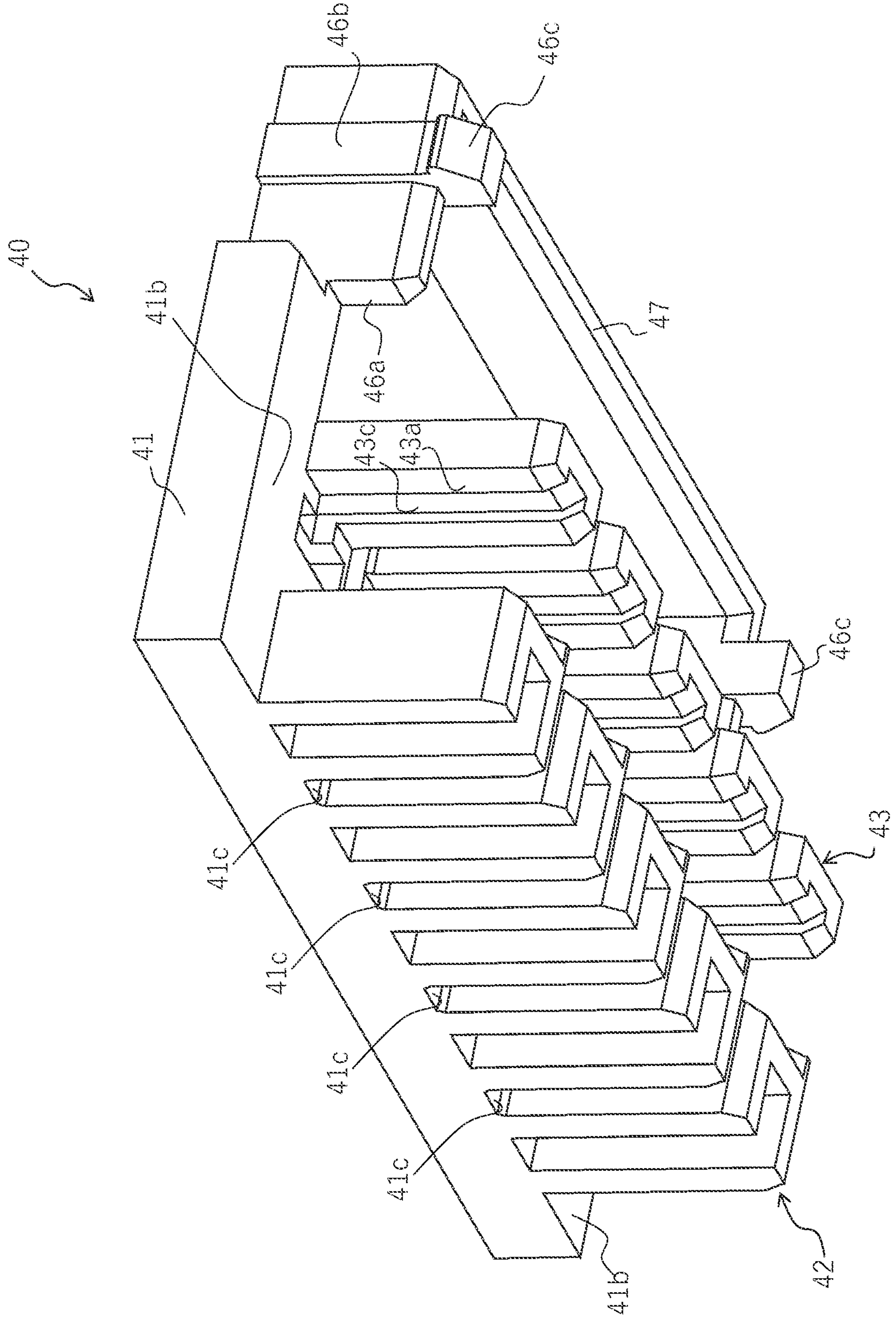
FIG. 9 is a perspective view of the movable housing as viewed from a front side.

As illustrated in FIG. 9, the second abutting wall 43 has a front surface 43*a*. The front surface 43*a* of the second abutting wall 43 is configured to be able to abut on the connecting plate 24*c* of the displacement portion 24.

A groove 43*c* extending vertically at the center in the width direction of the front surface 43*a* is formed on the front surface 43*a* side of the second abutting wall 43. The groove 43*c* functions as a retraction space for burrs when burrs remain in the carrier cutting portion 24*h*. That is, when the burrs and (the front surface 43*a* of the second abutting wall 43 of) the movable housing 40 come into contact with each other at the time of assembling the movable housing 40, there is a possibility that cutting residue is generated from the movable housing 40, but the generation of the cutting residue is prevented by the groove 43*c*. The upper side of the groove 43*c* is connected to the recessed portion 41*d*.

As illustrated in FIG. 10, the second abutting wall 43 has a rear surface 43*b*. The rear surface 43*b* of the second abutting wall 43 abuts on the arrangement rear surface 35*c* of the fixed housing 30 when the movable housing 40 is displaced in the backward direction. As a result, the moving range of the movable housing 40 in the backward direction with respect to the fixed housing 30 is limited.

The movable housing 40 has a pair of side walls 46. The pair of side walls 46 are walls protruding to lower side than the lower surface 41*b* of the top wall 41, and are formed on both outer sides in the width direction of the rear portion of the movable housing 40. A front surface 46*a* (see FIG. 9) of the side wall 46 abuts on the side wall 36 of the fixed housing 30 when the movable housing 40 is displaced in the forward direction. As a result, the moving range of the movable housing 40 in the forward direction with respect to the fixed housing 30 is limited.

The movable housing 40 has a rear wall 47. The rear wall 47 connects rear ends of the pair of side walls 46 in the width direction.

The movable housing 40 includes a pair of clamped portions 46*b*. The pair of clamped portions 46*b* are portions clamped from the outside in the width direction by the clamping portion 38 of the fixed housing 30.

The clamped portion 46*b* protrudes outward in the width direction with respect to the side wall 46. The clamped portion 46*b* is located at an intermediate portion in the front-rear direction of the side wall 46 and is formed over the entire side wall 46 in the vertical direction.

The movable housing 40 has a pair of locked portions 46*c*. The pair of locked portions 46*c* are portions locked to the clamping portion 38 of the fixed housing 30. As a result, the movable housing 40 is prevented from being detached from the fixed housing 30 in the upward direction.

The locked portion 46*c* is formed below the clamped portion 46*b* and protrudes outward in the width direction with respect to the clamped portion 46*b*. The locked portion 46*c* is formed with an inclined surface for making it easy to push the pair of locked portions 46*c* into the pair of clamping portions 38 of the fixed housing 30.

(Operation at the Time of Connection)

Next, the operation of the connector 10 when the mating terminal 80 is connected will be described.

As illustrated in FIG. 11, when connection is performed in a state where the mating terminal 80 is displaced in the −X direction, the distal end of the mating terminal 80 abuts on the X-direction inclined surface 45*a* of the movable housing 40. As a result, the movable housing 40 is displaced in a direction in which the positional deviation is resolved (−X direction).

When the displacement amount of the movable housing 40 is large to some extent, the movable-side limiting portions 42 and 43 (specifically, the first abutting wall 42) of the movable housing displaced in the −X direction come into contact with the displacement portion 24 of the terminal 20, so that the displacement portion 24 is displaced in the same direction (−X direction). As a result, the displacement portion 24 remains within a position range (a position range with respect to the movable housing 40) connectable to the mating terminal 80 inserted from the insertion port 44.

Figure 12:
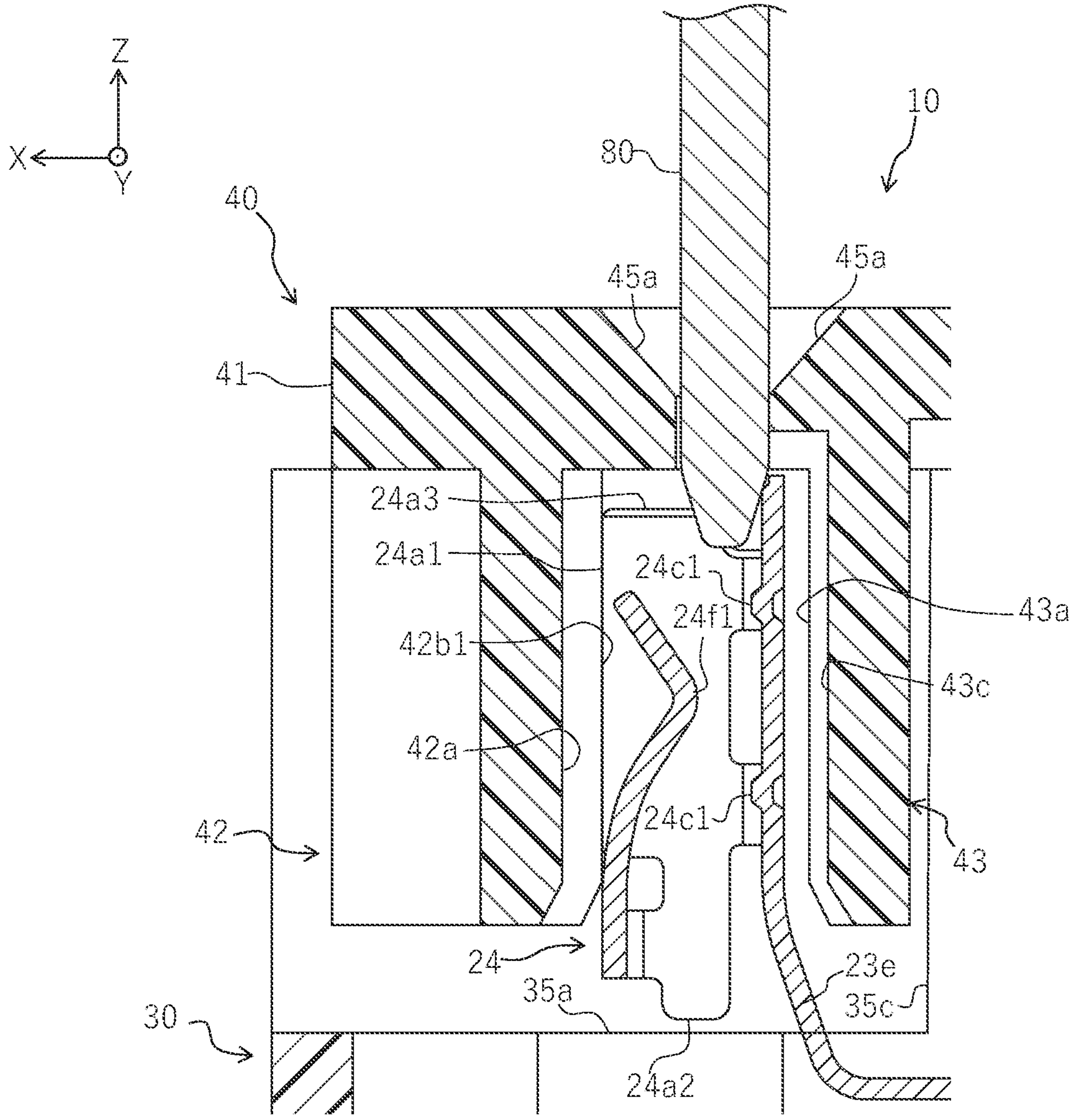
FIG. 12 is a cross-sectional view illustrating a state at the moment when the connection object whose position is deviated comes into contact with the terminal.
Figure 13:
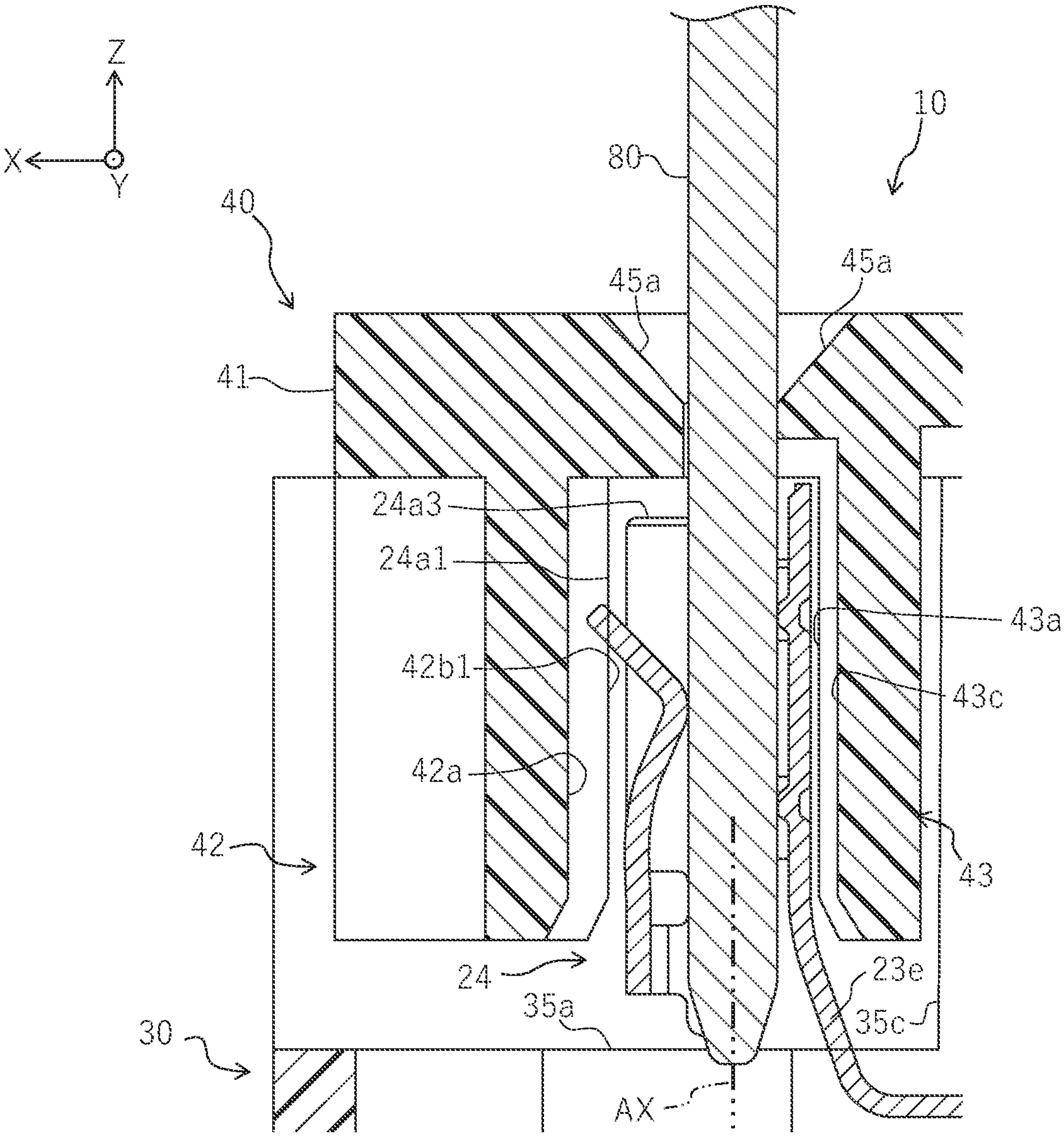
FIG. 13 is a cross-sectional view illustrating a state after connection is completed.

FIG. 12 illustrates a state at the moment when the displacement of the movable housing 40 is completed and the mating terminal 80 comes into contact with the displacement portion 24 of the terminal 20. In this state, the displacement portion 24 is in contact with the first abutting wall 42 of the movable housing 40.

When the connection is further advanced, the displacement portion 24 is separated from the first abutting wall 42 of the movable housing 40 by the mating terminal 80 being connected. Then, the displacement portion 24 comes into a state of not contacting either the first abutting wall 42 or the second abutting wall 43 of the movable housing 40, and the connection work is completed (see FIG. 13).

As described above, the structure of the connector 10 such as the insertion port 44 and the movable-side limiting portions 42 and 43 is determined such that the displacement portion 24 does not abuts on the movable-side limiting portions 42 and 43 of the movable housing 40 at the time point the connection work is completed.

Note that, although the case of the positional deviation in the −X direction has been described above, a similar operation occurs in the case of the positional deviation in the +X direction.

<Functional Effects>

Next, functional effects of the present embodiment will be described.

In the present embodiment, as illustrated in FIG. 4, the connector 10 includes the movable housing 40 that is displaceable with respect to the attachment object 90 in the X direction, which is a direction perpendicular to the connection direction, and a terminal 20 configured to electrically connect the attachment object 90 and the connection object 80. The terminal 20 includes the displacement portion 24 that is displaceable in the X direction with respect to the attachment object 90. The contact portions 24*c*1 and 24*f*1 configured to contact the connection object 80 are formed in the displacement portion 24.

As described above, since both the movable housing 40 and the displacement portion 24 can be displaced in the X direction with respect to the attachment object 90, when the connector 10 and the connection object 80 are connected, the movable housing 40 and the displacement portion 24 can be displaced in accordance with the positional deviation of the connection object 80 in the X direction.

Furthermore, in the present embodiment, the displacement portion 24 is displaceable with respect to the movable housing 40.

Therefore, unlike the prior art (technique in which when the displacement portion is displaced, the movable housing is also displaced integrally with the displacement portion), the mass of the portion that is integrally displaced when the displacement portion 24 is displaced is small. As a result, the inertial force acting on the integrally displaced portion can be reduced. In addition, it is possible to increase the resonance frequency of the displacement portion 24 of the connector 10 in a state of being connected to the connection object 80, and it is easy to make the frequency (natural frequency) of the displacement portion 24 of the connector 10 not coincide with the frequency of a vibration of an engine of an automobile, a vibration from the road surface, or the like. As a result, wear of the contact portions 24*c*1 and 24*f*1 and breakage of the intermediate deformation portion 23 can be prevented.

However, since the displacement portion 24 can be displaced with respect to the movable housing 40, when the movable housing 40 is displaced with respect to the attachment object 90, the displacement portion 24 is displaced with respect to the movable housing 40.

Here, in the present embodiment, the movable housing 40 includes the movable-side limiting portions 42 and 43. The movable-side limiting portions 42 and 43 are configured such that when the movable housing 40 is displaced in the X direction, the movable-side limiting portions 42 and 43 abut the displacement portion 24, so that the position of the displacement portion 24 in the X direction with respect to the movable housing 40 is limited to a predetermined range.

Therefore, for example, by displacing the movable housing 40 in accordance with the positional deviation of the connection object 80 in the X direction prior to the contact between the connection object 80 and the terminal 20 (see FIG. 12), the displacement portion 24 can be displaced in accordance with the positional deviation of the connection object 80 in the X direction in advance prior to the contact between the connection object 80 and the terminal 20. As a result, the distance of the positional deviation possible to be coped with can be increased as compared with an aspect in which the positional deviation of the connection object 80 is coped with only by the structure of the terminal 20.

Further, in the present embodiment, the movable housing 40 is not displaceable in the Y direction which is the arrangement direction of the plurality of displacement portions 24. Therefore, it is not necessary to provide a structure for displacing the movable housing 40 in the Y direction, and as a result, for example, the connector 10 can be downsized in the Y direction.

Further, in the present embodiment, the dimension of the insertion port 44 in the Y direction is twice or more the dimension of the mating terminal 80 in the Y direction. Therefore, even if the position of the mating terminal 80 in the Y direction is deviated, the mating terminal 80 can enter the insertion port 44. Furthermore, in the present embodiment, the displacement portion 24 is configured such that the mating terminal 80 and the contact portions 24*c*1 and 24*f*1 appropriately come into contact with each other even if the position of the mating terminal 80 in the Y direction is deviated. Therefore, the displacement portion 24 can cope with the positional deviation of the mating terminal 80 in the Y direction without being displaced in the Y direction.

As described above, the positional deviation of the mating terminal 80 in the Y direction is coped with by the insertion port 44 having a large dimension in the Y direction and the displacement portion 24 having a large dimension in the Y direction.

Since the displacement portion 24 can cope with the positional deviation in the Y direction without being displaced in the Y direction, the intermediate deformation portion 23 that displaces the displacement portion 24 in the Y direction is less likely to be deformed.

If the intermediate deformation portion 23 does not need to be deformed to absorb the positional deviation in the Y direction, stress generated by such deformation (i.e., deformation necessary for displacement of the displacement portion 24 in the Y direction) becomes small, so that elastic deformation amount (i.e., displacement amount of the displacement portion) in the X direction of the intermediate deformation portion 23 at the time of connection work and elastic deformation amount (i.e., displacement amount of the displacement portion) in the Z direction of the intermediate deformation portion 23 after connection can be set large.

Furthermore, in the present embodiment, the plate thickness direction of the intermediate deformation portion 23 is directed in a direction (a direction in the ZX plane) perpendicular to the direction in which the movable housing 40 cannot be displaced (the Y direction) in the entire range. Therefore, the deformation of the intermediate deformation portion 23 is mainly deformation in the plate thickness direction, and breakage of the intermediate deformation portion 23 is prevented.

In the present embodiment, the connector 10 includes the fixed housing 30 configured to be fixed to the attachment object 90, and the fixed housing 30 has the fixed-side limiting portions 36 and 37 (the side walls 36 and the partition walls 37 of fixed housing 30). That is, the position of the displacement portion 24 in the Y direction with respect to the fixed housing 30 is limited to a predetermined range by the fixed-side limiting portions 36 and 37 of the fixed housing 30.

Therefore, in the manufacturing process of the connector 10, since the position of the displacement portion 24 with respect to the fixed housing 30 is determined to some extent before the movable housing 40 is assembled to the fixed housing 30, assembling of the movable housing 40 is facilitated.

Further, in the present embodiment, the contact portions 24*c*1 and 24*f*1 are configured to contact the connection object 80 so as to sandwich the connection object 80 in the X direction. Therefore, the displacement portion 24 can easily follow the positional deviation of the connection object 80 in the X direction.

Further, in the present embodiment, the displacement portion 24 includes the elastic deformation portions 24*e* and 24*f* (the contact piece base portion 24*e*, and the contact piece 24*f*) that are elastically deformed when the connection object 80 is connected. Therefore, the contact portion 24*f*1 can be elastically brought into contact with the connection object 80.

However, since the displacement portion 24 can be displaced with respect to the movable housing 40, it is difficult to limit the deformation of the elastic deformation portions 24*e* and 24*f* by the movable housing 40.

Therefore, the displacement portion 24 further includes a deformation limiting portion 24*g* that limits the deformation amount of the elastic deformation portions 24*e* and 24*f* by abutting on the elastic deformation portions 24*e* and 24*f* when the elastic deformation portions 24*e* and 24*f* are deformed. Therefore, excessive deformation of the elastic deformation portions 24*e* and 24*f* is limited by the deformation limiting portion 24*g*, and the elastic deformation portions 24*e* and 24*f* are prevented from being plastically deformed. Further, since excessive deformation of the elastic deformation portions 24*e* and 24*f* (in particular, the contact piece base portion 24*e*) is limited by the deformation limiting portion 24*g*, a decrease in contact pressure with respect to the connection object 80 is prevented, so that the contact pressure is stabilized.

Further, in the present embodiment, the limiting hole 24*g* is formed in the second side plate 24*b*, and the distal end of the contact piece base portion 24*e* is disposed in the limiting hole 24*g*, so that the deformation amount of the contact piece base portion 24*e* is limited. As a result, the deformation limiting portion 24*g* that limits the deformation amount of the elastic deformation portions 24*e* and 24*f* is realized with a simple configuration.

Further, in the present embodiment, as illustrated in FIG. 6, when the contact piece base portion 24*e* extends from the first side plate 24*a* and the contact piece 24*f* extends from the contact piece base portion 24*e*, the end 24*a*1 on the other side in the X direction of the first side plate 24*a* is located on the one side in the X direction with respect to the end 24*b*1 on the other side in the X direction of the second side plate 24*b*. Therefore, when the displacement portion 24 is produced by cutting and bending a plate material, the width dimension of the contact piece 24*f* can be increased.

Further, both the end 24*a*1 on the other side in the X direction of the first side plate 24*a* and the end 24*b*1 on the other side in the X direction of the second side plate 24*b* are configured to be able to abut on the movable-side limiting portions 42 and 43 (specifically, the first abutting wall 42). Therefore, the movable-side limiting portions 42 and 43 abut on the displacement portion 24, so that the posture of the displacement portion 24 is prevented from being collapsed.

However, in a mode in which a portion of the terminal 20 extending from the displacement portion 24 extends, for example, parallel to the connection axis AX (see FIG. 13) of the connection object 80, when the displacement portion 24 is displaced, the portion may collide with the distal end of the connection object 80.

Therefore, in the present embodiment, the terminal 20 includes the avoidance portion 23*e* (the inclined direction portion 23*e*) extending from the displacement portion 24 and extending in a direction away from the connection axis AX of the connection object 80. Therefore, the collision as described above is prevented.

Note that the structure of the avoidance portion extending in the direction away from the connection axis AX of the connection object 80 is not limited to the structure of the avoidance portion 23*e* of the present embodiment (the structure extending in the oblique direction downward and backward from the displacement portion 24). For example, the avoidance portion may have a structure that once extends backward from the displacement portion 24 and then extends downward via a curved portion (i.e., a structure that forms a so-called crank shape together with the second forward direction portion 23*d*).

Further, in the present embodiment, since the displacement portion 24 can be displaced with respect to the movable housing 40, the movable housing 40 cannot be appropriately supported by the displacement portion 24.

Therefore, in the present embodiment, the movable housing 40 is supported by coming into contact with a support member 30 (the fixed housing 30) that is not displaced with respect to the attachment object 90. Therefore, the movable housing 40 can be appropriately supported.

Further, in the present embodiment, the support member 30 (the fixed housing 30) is in a state of clamping the movable housing 40 by the pair of clamping portions 38. Therefore, the movable housing 40 is prevented from rattling with respect to the support member 30.

Note that one of the pair of clamping portions 38 may elastically press and contact the movable housing 40, and the other may receive the pressed movable housing 40. Also, the pair of clamping portions may be formed in the movable housing, and the movable housing may clamp a support member (for example, the fixed housing).

[Supplementary Explanation]

Although it is obvious that the present disclosure is not limited to the above embodiments, the following supplements will be made for the sake of clarity.

In the above embodiment, an example in which the movable housing 40 includes a structure (X-direction inclined surface 45*a*) that displaces the movable housing in accordance with the positional deviation of the connection object 80 has been described. However, the movable housing of the present disclosure is not limited thereto, and may not include the above-described structure.

Further, in the above embodiment, an example in which the connector 10 includes the fixed housing 30 has been described, but the connector of the present disclosure is not limited thereto.

Further, in the above embodiment, an example has been described in which the movable housing 40 is displaceable in the X direction, which is one direction among the directions perpendicular to the connection direction, and is not displaceable in the Y direction among the directions perpendicular to the connection direction: however, the movable housing of the present disclosure is not limited thereto. The movable housing of the present disclosure may be displaceable in both the X direction and the Y direction. In such case, the movable housing may have a movable-side limiting portion with respect to the Y direction. The movable-side limiting portion with respect to the Y direction means a portion configured such that when the movable housing is displaced in the Y direction, the movable-side limiting portion abuts on the displacement portion, so that the position of the displacement portion in the Y direction with respect to the movable housing is limited to a predetermined range.

Further, in the above embodiment, an example has been described in which the direction in which the movable housing 40 can be displaced (X direction) among the directions perpendicular to the connection direction is a direction perpendicular to the terminal arrangement direction, and the direction in which the movable housing 40 cannot be displaced (Y direction) among the directions perpendicular to the connection direction is the terminal arrangement direction: however, the present disclosure is not limited thereto. The direction in which the movable housing 40 can be displaced (X direction) among the directions perpendicular to the connection direction may be the terminal arrangement direction, and the direction in which the movable housing 40 can not be displaced (Y direction) among the directions perpendicular to the connection direction may be the direction perpendicular to the terminal arrangement direction. In other words, in the above embodiment, the example in which the "X direction" is a direction perpendicular to the terminal arrangement direction has been described: however, the "X direction" of the present disclosure may be the terminal arrangement direction.

In the above embodiment, an example in which the connector 10 includes the plurality of attachment fittings 50 has been described: however, the connector of the present disclosure is not limited thereto, and may not include an attachment fitting.

In the above embodiment, the connector 10 in which the connection object 80 is connected from the upper side (+Z direction) with respect to the mounting surface of the board 90 as the attachment object has been described: however, the connector of the present disclosure is not limited thereto, and the connection object may be connected from a direction parallel to the mounting surface of the board, or the connection object may be connected from the lower side with respect to the mounting surface of the board.

In the above embodiment, the example in which the movable housing 40 includes the movable-side limiting portions 42 and 43 has been described: however, the movable housing of the present disclosure is not limited thereto, and may not include the movable-side limiting portion.

Note that, even when the movable housing does not have the movable-side limiting portion, being displaceable of the movable housing has, for example, the following beneficial effects. To be specific, since the movable housing in which the insertion port is formed can be displaced, it is possible to cope with the positional deviation of the connection object without impairing dustproof property by increasing the insertion port.

In the above embodiment, the example has been described in which one terminal 20 electrically connecting the attachment object and the connection object is formed of one member integrally formed of a conductive material: however, the terminal of the present disclosure is not limited thereto, and may be configured by combining two or more members. In such case, the terminal may not have the intermediate deformation portion.

In the above embodiment, the terminal 20 in which the displacement of the displacement portion 24 is realized by the intermediate deformation portion 23 being deformed has been described: however, the terminal of the present disclosure is not limited thereto. For example, when the terminal is configured by combining two or more members, the displacement of the displacement portion can be realized even if the terminal does not have the intermediate deformation portion.

In the above embodiment, the example (That is, an example in which "one side in the X direction" of the seventh aspect is the −X direction) in which the connecting plate 24*c* connects the rear ends of the first side plate 24*a* and the second side plate 24*b* has been described: however, the connecting plate of the present disclosure is not limited thereto, and may be a connecting plate that connects the front ends of the first side plate and the second side plate. That is, the "one side in the X direction" may be the +X direction.

Even in the above case, the avoidance portion may extend from the connecting plate of the displacement portion as in the above embodiment. The structure of the avoidance portion in such case is, for example, a structure extending in an oblique direction of the downward direction (−Z direction) and the forward direction (one side in the X direction which is the +X direction).

In the above embodiment, it has been described that the displacement portion 24 is basically not in contact with the arrangement bottom surface 35*a* in the state where the connector 10 and the mating terminal 80 are connected. However, the displacement portion 24 may be in contact with the arrangement bottom surface 35*a* in the state where the connector 10 and the mating terminal 80 are connected. This is because even in such a state, an effect of suppressing repeated sliding and the like between the contact portion and the connection object can be obtained to a certain extent.

REFERENCE SIGNS LIST

10 connector
20 terminal
21 board connecting portion
22 held portion
23 intermediate deformation portion
23*e* inclined direction portion (avoidance portion)
24 displacement portion
24*a* first side plate
24*a*1 front end edge (end on the other side in the X direction of the first side plate)
24*b* second side plate
24*b*1 front end edge (end on the other side in the X direction of the second side plate)
24*c* connecting plate
24*c*1 bead (contact portion)
24*e* contact piece base portion (elastic deformation portion)
24*f* contact piece (elastic deformation portion)
24*f*1 mountain-shaped contact portion (contact portion)
24*g* limiting hole (deformation limiting portion)
30 fixed housing (support member)
36 side wall (fixed-side limiting portion)
37 partition wall (fixed-side limiting portion)
38 clamping portion
40 movable housing
42 first abutting wall (movable-side limiting portion)
43 second abutting wall (movable-side limiting portion)
44 insertion port
45*a* X-direction inclined surface
46*b* clamped portion
80 mating terminal (connection object)
90 board (attachment object)

What is claimed is:

1. A connector that is attachable to an attachment object, the connector comprising:

a movable housing that is displaceable with respect to the attachment object in an X direction, which is a direction perpendicular to a connection direction of a connection object to the connector; and a terminal configured to electrically connect the attachment object and the connection object, wherein the terminal includes a displacement portion that is formed with a contact portion configured to contact the connection object and that is displaceable with respect to the attachment object in the X direction, and wherein the displacement portion is displaceable with respect to the movable housing, wherein the movable housing is not displaceable with respect to the attachment object in a Y direction, which is a direction perpendicular to both the connection direction and the X direction.

2. The connector according to claim 1, further comprising:

a fixed housing configured to be fixed to the attachment object, wherein the fixed housing includes a fixed-side limiting portion, and wherein the fixed-side limiting portion is configured such that when the displacement portion is displaced in the Y direction, the fixed-side limiting portion abuts on the displacement portion, so that a position of the displacement portion in the Y direction with respect to the fixed housing is limited to a predetermined range.

3. The connector according to claim 1, wherein the contact portion is configured to contact the connection object so as to sandwich the connection object in the X direction.

4. A connector that is attachable to an attachment object, the connector comprising:

a movable housing that is displaceable with respect to the attachment object in an X direction, which is a direction perpendicular to a connection direction of a connection object to the connector; and a terminal configured to electrically connect the attachment object and the connection object, wherein the terminal includes a displacement portion that is formed with a contact portion configured to contact the connection object and that is displaceable with respect to the attachment object in the X direction, and wherein the displacement portion is displaceable with respect to the movable housing, wherein the displacement portion includes:

an elastic deformation portion that elastically deforms when the connection object is connected; and a deformation limiting portion that limits a deformation amount of the elastic deformation portion by abutting on the elastic deformation portion.

5. A connector that is attachable to an attachment object, the connector comprising:

a movable housing that is displaceable with respect to the attachment object in an X direction, which is a direction perpendicular to a connection direction of a connection object to the connector; and a terminal configured to electrically connect the attachment object and the connection object, wherein the terminal includes a displacement portion that is formed with a contact portion configured to contact the connection object and that is displaceable with respect to the attachment object in the X direction, and wherein the displacement portion is displaceable with respect to the movable housing, wherein the displacement portion includes:

a first side plate and a second side plate both facing each other in a Y direction with plate thickness directions thereof oriented in the Y direction;

a connecting plate that connects the first side plate and the second side plate in the Y direction with a plate thickness direction thereof oriented in the X direction, the connecting plate being in contact with the connection object from one side in the X direction;

a contact piece base portion that extends from the first side plate toward the second side plate; and a contact piece that extends from the contact piece base portion and that elastically contacts the connection object from another side in the X direction, and wherein a limiting hole is formed in the second side plate, and a distal end of the contact piece base portion is disposed in the limiting hole, so that a deformation amount of the contact piece base portion is limited.

6. A connector that is attachable to an attachment object, the connector comprising:

a movable housing that is displaceable with respect to the attachment object in an X direction, which is a direction perpendicular to a connection direction of a connection object to the connector; and a terminal configured to electrically connect the attachment object and the connection object, wherein the terminal includes a displacement portion that is formed with a contact portion configured to contact the connection object and that is displaceable with respect to the attachment object in the X direction, and wherein the displacement portion is displaceable with respect to the movable housing, wherein the movable housing includes a movable-side limiting portion, wherein the movable-side limiting portion is configured such that, when the movable housing is displaced in the X direction, the movable-side limiting portion abuts on the displacement portion, so that a position of the displacement portion in the X direction with respect to the movable housing is limited to a predetermined range, wherein the displacement portion includes:

a first side plate and a second side plate both facing each other in a Y direction with plate thickness directions thereof oriented in the Y direction;

a connecting plate that connects the first side plate and the second side plate in the Y direction with a plate thickness direction thereof oriented in the X direction, the connecting plate being in contact with the connection object from one side in the X direction;

a contact piece base portion that extends from the first side plate toward the second side plate; and a contact piece that extends from the contact piece base portion and that elastically contacts the connection object from another side in the X direction, wherein both an end on the other side in the X direction of the first side plate and an end on the other side in the X direction of the second side plate are configured to be able to abut on the movable-side limiting portion, and wherein the end on the other side in the X direction of the first side plate is located further toward the one side in the X direction than the end on the other side in the X direction of the second side plate.

7. A connector that is attachable to an attachment object, the connector comprising:

a movable housing that is displaceable with respect to the attachment object in an X direction, which is a direction perpendicular to a connection direction of a connection object to the connector; and a terminal configured to electrically connect the attachment object and the connection object, wherein the terminal includes a displacement portion that is formed with a contact portion configured to contact the connection object and that is displaceable with respect to the attachment object in the X direction, wherein the displacement portion is displaceable with respect to the movable housing, wherein the terminal includes an avoidance portion extending from the displacement portion and extending in a direction away from a connection axis of the connection object, wherein the displacement portion includes a connecting plate having a plate thickness direction oriented in the X direction, wherein a lower end of the connecting plate, which is on a side of the attachment object in the connection direction, is connected to the avoidance portion, and wherein an upper end of the avoidance portion is located above a lower end of the displacement portion.

8. The connector according to claim 1, wherein the movable housing is supported by being in contact with the attachment object or a support member that is not displaced with respect to the attachment object.

9. The connector according to claim 1, wherein the movable housing is supported by being in contact with a support member that is not displaced with respect to the attachment object, and wherein one of the movable housing or the support member clamps another of the movable housing or the support member.

* * * * *